US012288918B2

(12) United States Patent
Wang et al.

(10) Patent No.: US 12,288,918 B2
(45) Date of Patent: Apr. 29, 2025

(54) PHASE SHIFTER AND ANTENNA

(71) Applicants: Beijing BOE Sensor Technology Co., Ltd., Beijing (CN); BOE Technology Group Co., Ltd., Beijing (CN)

(72) Inventors: Xiaobo Wang, Beijing (CN); Haocheng Jia, Beijing (CN); Chuncheng Che, Beijing (CN); Zhifeng Zhang, Beijing (CN); Cuiwei Tang, Beijing (CN); Yong Liu, Beijing (CN); Honggang Liang, Beijing (CN); Sheng Chen, Beijing (CN); Xueyan Su, Beijing (CN); Hailong Lian, Beijing (CN); Yi Ding, Beijing (CN); Jing Xie, Beijing (CN); Wei Zhang, Beijing (CN); Weisi Zhou, Beijing (CN); Meng Wei, Beijing (CN); Jing Wang, Beijing (CN); Zhenguo Zhang, Beijing (CN); Feng Qu, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/018,958

(22) PCT Filed: Jan. 27, 2022

(86) PCT No.: PCT/CN2022/074197

§ 371 (c)(1),
(2) Date: Jan. 31, 2023

(87) PCT Pub. No.: WO2023/141854

PCT Pub. Date: Aug. 3, 2023

(65) Prior Publication Data

US 2024/0258668 A1 Aug. 1, 2024

(51) Int. Cl.
*H01P 1/18* (2006.01)

(52) U.S. Cl.
CPC .................................... *H01P 1/182* (2013.01)

(58) Field of Classification Search
CPC .. H01Q 3/36; H01Q 1/22; H01Q 1/50; H01Q 3/44; H01Q 1/241; H01Q 9/0457;
(Continued)

(56) References Cited

U.S. PATENT DOCUMENTS

2005/0178646 A1 8/2005 De Los Santos
2021/0066772 A1* 3/2021 Wu ........................ H01Q 1/241
2021/0408680 A1* 12/2021 Xi ........................... H01P 1/184

FOREIGN PATENT DOCUMENTS

CN 101499551 A 8/2009
CN 103617888 A 3/2014
(Continued)

*Primary Examiner* — Lincoln D Donovan
*Assistant Examiner* — Tyler J Pereny
(74) *Attorney, Agent, or Firm* — Nath, Goldberg & Meyer; Joshua B. Goldberg

(57) ABSTRACT

There is provided a phase shifter having a phase shift region and a peripheral region, and including a first substrate, a second substrate and a dielectric layer between such two substrates; the first substrate includes a first dielectric substrate, a first electrode and a first auxiliary structure; the second substrate includes a second dielectric substrate, a second electrode and a second auxiliary structure; the phase shift region includes overlapping regions; the first electrode and the second electrode are located in the phase shift region, and have orthographic projections, on the first dielectric substrate, overlapped at least partially in the overlapping regions; the first auxiliary structure is in the peripheral region and on a side, close to the dielectric layer, of the first dielectric substrate; the second auxiliary structure (Continued)

is in the peripheral region and on a side, close to the dielectric layer, of the second dielectric substrate.

20 Claims, 9 Drawing Sheets

(58) Field of Classification Search
CPC .......... H01P 1/184; H01P 1/182; H01P 1/181; H01P 1/18; H01P 3/165; H01P 3/12
See application file for complete search history.

(56) References Cited

FOREIGN PATENT DOCUMENTS

| | | | |
|---|---|---|---|
| CN | 106773338 | A | 5/2017 |
| CN | 108663854 | A | 10/2018 |
| CN | 109830806 | A | 5/2019 |
| CN | 111740200 | A | 10/2020 |
| CN | 212392362 | U | 1/2021 |
| CN | 113611991 | A | 11/2021 |
| EP | 1530249 | A1 | 5/2005 |
| EP | 3609017 | A1 | 2/2020 |

* cited by examiner

PHASE SHIFTER AND ANTENNA

This is a National Phase Application filed under 35 U.S.C. 371 as a national stage of PCT/CN2022/074197, filed Jan. 27, 2022, the content of each of which is hereby incorporated by reference in its entirety.

TECHNICAL FIELD

The present disclosure relates to the field of communication technology, and particularly relates to a phase shifter and an antenna.

BACKGROUND

In the existing liquid crystal phase shifter structure, a periodic patch capacitor loading is introduced into an upper glass substrate of a cell, a variable capacitor is adjusted by adjusting a difference between voltages loaded on two metal plates in different planes to drive liquid crystal molecules to deflect, to obtain different liquid crystal material characteristics, and accordingly change a capacitance value of the capacitor, so that a phase of a microwave signal fed in is adjusted.

SUMMARY

The present disclosure is directed to solve at least one problem in the related art, and provides a phase shifter and an antenna.

In a first aspect, the present disclosure provides a phase shifter, including a first substrate and a second substrate disposed opposite to each other, and a dielectric layer disposed between the first substrate and the second substrate; the first substrate includes a first dielectric substrate and a first electrode arranged on a side of the first dielectric substrate close to the dielectric layer; the second substrate includes a second dielectric substrate and a second electrode arranged on a side of the second dielectric substrate close to the dielectric layer; the phase shifter has a phase shift region and a peripheral region; the phase shift region includes at least one group of overlapping regions, and each group includes a plurality of overlapping regions arranged at intervals along a transmission direction in which a microwave signal is transmitted; the first electrode and the second electrode are both located in the phase shift region, and orthographic projections of the first electrode and the second electrode on the first dielectric substrate are overlapped at least partially in the overlapping regions to form a plurality of capacitors; the phase shifter further includes a first auxiliary structure and a second auxiliary structure; the first auxiliary structure is located in the peripheral region and arranged on a side, close to the dielectric layer, of the first dielectric substrate; the second auxiliary structure is located in the peripheral region and arranged on a side, close to the dielectric layer, of the second dielectric substrate.

In some implementations, the first auxiliary structure includes a plurality of first auxiliary sub-electrodes, and the first auxiliary sub-electrodes and the first electrode are arranged in a same layer and made of a same material; and/or the second auxiliary structure includes a plurality of second auxiliary sub-electrodes, and the second auxiliary sub-electrodes and the second electrode are arranged in a same layer and made of a same material.

In some implementations, in response to that the first auxiliary structure includes a plurality of first auxiliary sub-electrodes, a thickness of each first auxiliary sub-electrode is equal to that of the first electrode; in response to that the second auxiliary structure includes a plurality of second auxiliary sub-electrodes, a thickness of each second auxiliary sub-electrode is equal to that of the second electrode.

In some implementations, in response to that the first auxiliary structure includes a plurality of first auxiliary sub-electrodes and the second auxiliary structure includes a plurality of second auxiliary sub-electrodes, an orthographic projection of each first auxiliary sub-electrode on the first dielectric substrate is overlapped with an orthographic projection of one second auxiliary sub-electrode on the first dielectric substrate.

In some implementations, a center of an orthographic projection of each first auxiliary sub-electrode on the first dielectric substrate is coincident with a center of an orthographic projection of one second auxiliary sub-electrode on the first dielectric substrate.

In some implementations, an area of the phase shift region is equal to S11; an area of the peripheral region is equal to S12, in response to that the first auxiliary structure includes a plurality of first auxiliary sub-electrodes, an area of an orthographic projection of the first electrode on the first dielectric substrate is equal to S13; an area of an orthographic projection of each first auxiliary sub-electrode on the first dielectric substrate is equal to S14; S13:S11=S14:S12; and/or in response to that the second auxiliary structure includes a plurality of second auxiliary sub-electrodes, an area of an orthographic projection of the second electrode on the second dielectric substrate is equal to S15; an area of an orthographic projection of each second auxiliary sub-electrode on the second dielectric substrate is equal to S16; S15:S11=S16:S12.

In some implementations, in response to that the first auxiliary structure includes a plurality of first auxiliary sub-electrodes, a minimum distance between each first auxiliary sub-electrode and the first electrode ranges from 400 μm to 900 μm; in response to that the second auxiliary structure includes a plurality of second auxiliary sub-electrodes, a minimum distance between each second auxiliary sub-electrode and the second electrode ranges from 400 μm to 900 μm.

In some implementations, the phase shifter further includes a plurality of spacers arranged at intervals between the first substrate and the second substrate; each spacer includes a first end face and a second end face arranged opposite to each other, and the first end face is closer to the first substrate than the second end face; in response to that the first auxiliary structure includes a plurality of first auxiliary sub-electrodes and the second auxiliary structure includes a plurality of second auxiliary sub-electrodes, for each spacer, an orthographic projection of the first end face on the first dielectric substrate is located in an orthographic projection of one first auxiliary sub-electrode on the first dielectric substrate, and an orthographic projection of the second end face on the second dielectric substrate is located in an orthographic projection of one second auxiliary sub-electrode on the second dielectric substrate.

In some implementations, the phase shifter further includes a first protective layer and a second protective layer, the first protective layer is located on a side, away from the first dielectric substrate, of a layer where the first electrode and the first auxiliary structure are located, and the second protective layer is located on a side, away from the second dielectric substrate, of a layer where the second electrode and the second auxiliary structure are located.

In some implementations, a material of the first auxiliary structure and the second auxiliary structure includes organic resin.

In some implementations, a thickness of the first auxiliary structure is not less than that of the first electrode, and/or a thickness of the second auxiliary structure is not less than that of the second electrode.

In some implementations, a thickness of the first auxiliary structure is greater than a thickness of the first electrode by at least 0.3 μm; and/or a thickness of the second auxiliary structure is greater than a thickness of the second electrode by at least 0.3 μm.

In some implementations, the phase shifter further includes a plurality of spacers disposed at intervals between the first auxiliary structure and the second auxiliary structure.

In some implementations, the phase shifter further includes a first negative stress film layer covering the first electrode and a second negative stress film layer covering the second electrode; in the peripheral region, the first auxiliary structure is located on a side, away from the first dielectric substrate, of the first negative stress film layer; the second auxiliary structure is located on a side, away from the second dielectric substrate, of the second negative stress film layer.

In some implementations, a certain distance exists between a boundary of the first auxiliary structure and a boundary of the first electrode; a certain distance exists between a boundary of the second auxiliary structure and a boundary of the second electrode.

In some implementations, the phase shifter further includes a first mark pattern and a first buffer layer sequentially arranged along a direction away from the first dielectric substrate, and a second mark pattern and a second buffer layer sequentially arranged along a direction away from the second dielectric substrate; the first buffer layer is located between the first mark pattern and the first electrode, and the second buffer layer is located between the second mark pattern and the second electrode; an orthographic projection of the first mark pattern on the first dielectric substrate is overlapped with an orthographic projection of the first electrode on the first dielectric substrate; an orthographic projection of the second mark pattern on the first dielectric substrate is overlapped with an orthographic projection of the second electrode on the first dielectric substrate.

In some implementations, the first electrode includes a first transmission line and a second transmission line arranged side by side and each extending along the transmission direction in which the microwave signal is transmitted; the second electrode includes a plurality of patch structures arranged side by side along the transmission direction in which the microwave signal is transmitted, and orthographic projections of two end parts of any one of the patch structures on the first dielectric substrate are at least partially overlapped with orthographic projections of the first transmission line and the second transmission line on the first dielectric substrate respectively to form capacitors located in the overlapping region.

In some implementations, the two end parts of each patch structure are respectively a first end part and a second end part; for each patch structure, orthographic projections of the first end part and the first transmission line on the first dielectric substrate are overlapped at a first region, orthographic projections of the second end part and the second transmission line on the first dielectric substrate are overlapped at a second region, and areas of the first region and the second region are equal to each other.

In some implementations, along the transmission direction in which the microwave signal is transmitted, areas of first regions are monotonically increased or monotonically decreased, areas of second regions are monotonically increased or monotonically decreased.

In some implementations, the first electrode includes a first transmission line, extending along the transmission direction in which the microwave signal is transmitted, and a plurality of first branches connected to the first transmission line and arranged side by side in the transmission direction in which the microwave signal is transmitted; the second electrode includes a second transmission line, extending along the transmission direction in which the microwave signal is transmitted, and a plurality of second branches connected to the second transmission line and arranged side by side in the transmission direction in which the microwave signal is transmitted; an orthographic projection of an end part of each first branch, away from the first transmission line, on the first dielectric substrate is at least partially overlapped with an orthographic projection of an end part of one second branch, away from the second transmission line, on the first dielectric substrate, to form a capacitor located in the overlapping region.

In some implementations, the phase shifter further includes a first feeding structure and a second feeding structure, an end of each of the first transmission line and the second transmission line is electrically connected with the first feeding structure, and another end of each of the first transmission line and the second transmission line is electrically connected with the second feeding structure.

In some implementations, each of the first feeding structure and the second feeding structure is formed by a Balance-unbalance (BALUN) component.

In some implementations, the dielectric layer includes a liquid crystal layer.

In a second aspect, the present disclosure further provides a method for manufacturing a phase shifter, including: forming a first substrate and a second substrate, and aligning and combining the first substrate and the second substrate into a cell, and filling a dielectric layer between the first substrate and the second substrate; the phase shifter has a phase shift region and a peripheral region, the phase shift region includes at least one group of overlapping regions, and each group includes a plurality of overlapping regions arranged at intervals along the transmission direction in which the microwave signal is transmitted;

the forming the first substrate includes: providing a first dielectric substrate; and forming a first electrode and a first auxiliary structure on the first dielectric substrate, with the first electrode being located in the phase shift region, and the first auxiliary structure being located in the peripheral region;

the forming the second substrate includes: providing a second dielectric substrate; and forming a second electrode and a second auxiliary structure on the second dielectric substrate, with the second electrode being located in the phase shift region, and the second auxiliary structure being located in the peripheral region; orthographic projections of the first electrode and the second electrode in the overlapping regions are at least partially overlapped to form a plurality of capacitors.

In some implementations, the first auxiliary structure includes a plurality of first auxiliary sub-electrodes; the second auxiliary electrode includes a plurality of second auxiliary sub-electrodes;

the forming the first electrode and the first auxiliary sub-electrode includes: forming a first metal film layer on the first dielectric substrate, performing electroplating on the first metal film layer, and forming a pattern including the first electrode and the first auxiliary sub-electrode by a patterning process;

the forming the second electrode and the second auxiliary sub-electrode includes: forming a second metal film layer on the second dielectric substrate, performing electroplating on the second metal film layer, and forming a pattern including the second electrode and the second auxiliary sub-electrode by a patterning process.

In some implementations, a material of the first auxiliary structure and the second auxiliary structure includes organic resin.

In a third aspect, the present disclosure provides an antenna, including the phase shifter described above.

DETAILED DESCRIPTION

In order to make technical solutions of the present disclosure better understood, the present disclosure is further described in detail with reference to the accompanying drawings and the detailed description below.

Unless defined otherwise, technical or scientific terms used herein shall have the ordinary meaning as understood by one of ordinary skill in the art to which the present disclosure belongs. The use of "first", "second" and the like in the present disclosure is not intended to indicate any order, quantity, or importance, but rather is used to distinguish one element from another. Also, the use of terms "a," "an," or "the" and similar referents does not denote a limitation of quantity, but rather denotes the presence of at least one. The word "including/comprising" or "includes/comprises", and the like, means that the element or item preceding the word contains the element or item listed after the word and its equivalent, but does not exclude other elements or items. The terms "connected" or "coupled" and the like are not restricted to physical or mechanical connections, but may include electrical connections, whether direct or indirect. Terms "upper/on", "lower/below", "left", "right", and the like are used only to indicate relative positional relationships, and when the absolute position of the object being described is changed, the relative positional relationships may be changed accordingly.

Figure 1:
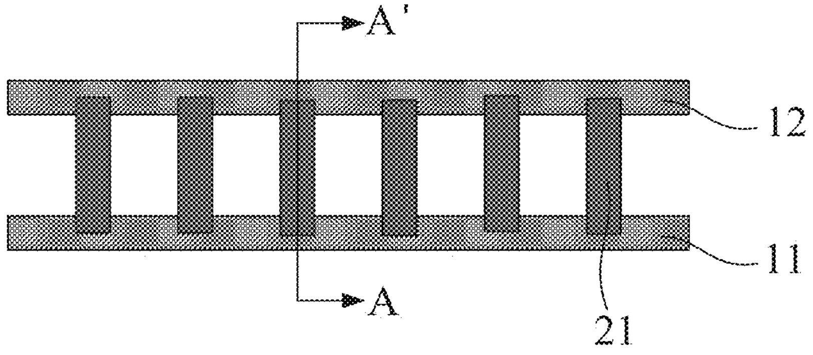
FIG. 1 is a schematic diagram of an exemplary liquid crystal phase shifter.
Figure 2:
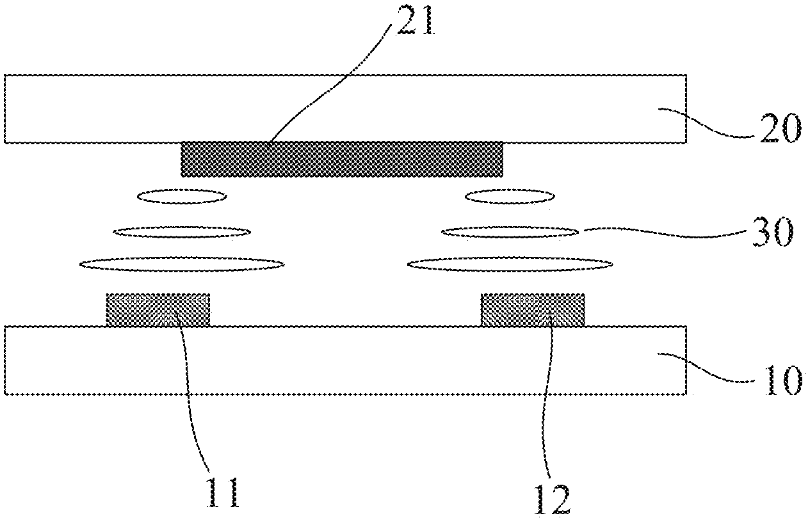
FIG. 2 is a cross-sectional view taken alone A-A' in FIG. 1.

FIG. 1 is an exemplary liquid crystal phase shifter; FIG. 2 is a cross-sectional view taken along A-A' in FIG. 1; as shown in FIGS. 1 and 2, the phase shifter includes a first substrate and a second substrate disposed opposite to each other, and a liquid crystal layer 30 disposed between the first substrate and the second substrate. The first substrate includes a first dielectric substrate 10 and a first electrode arranged on a side of the first dielectric substrate 10 close to the liquid crystal layer 30. The first electrode includes a first transmission line 11 and a second transmission line 12 arranged side by side and each extending along a transmission direction in which a microwave signal is transmitted. The second substrate includes a second dielectric substrate 20 disposed opposite to the first dielectric substrate 10, and a second electrode disposed on the second dielectric substrate 20, the second electrode includes a plurality of patch structures 21 disposed side by side along the transmission direction in which the microwave signal is transmitted. Orthographic projections of two end parts of each patch structure 21 on the first dielectric substrate 10 are at least partially overlapped with orthographic projections of the first transmission line 11 and the second transmission line 12 on the first dielectric substrate 10, so that a plurality of capacitors are formed between the patch structures 21 and the first transmission line 11 and between the patch structures 21 and the second transmission line 12 respectively. In this case, a direct current (DC) bias voltage may be applied to the first transmission line 11, the second transmission line 12 and the patch structures 21 to control a dielectric constant of the liquid crystal layer 30, so as to adjust a total capacitance per unit length, thereby achieving a phase shift effect on microwave signals output from the first transmission line 11 and the second transmission line 12. The uniformity of a thickness of each of the first transmission line 11, the second transmission line 12, the patch structures 21 and a film of liquid crystal material has significant influences on the performance of the phase shifter. The first dielectric substrate 10 and the second dielectric substrate 20 are generally glass-based, and the first transmission line 11, the second transmission line 12 and the patch structures 21 are made of metal materials During manufacturing the phase shifter, each metal film layer is formed on a glass substrate by electroplating, but due to characteristics (e.g., current aggregation) of a process of electroplating, it is very difficult to form a metal film layer with a relatively high uniformity on a glass substrate with a relatively large area. Meanwhile, a thickness of a liquid crystal cell of a conventional liquid crystal phase shifter is maintained by preparing spacers on the glass substrate, so that metal film layers on upper and lower glass substrates may deviate from set values due to fluctuations in processes for manufacturing other structures and the like, and thereby a thickness of a liquid crystal film layer between the upper and lower glass substrates may be influenced, an effect of periodically loading a liquid crystal capacitor cannot be realized, and the performance of the liquid crystal phase shifter is deteriorated.

In order to solve at least one technical problem in the related art, following technical solutions are provided in the present disclosure.

Figure 3:
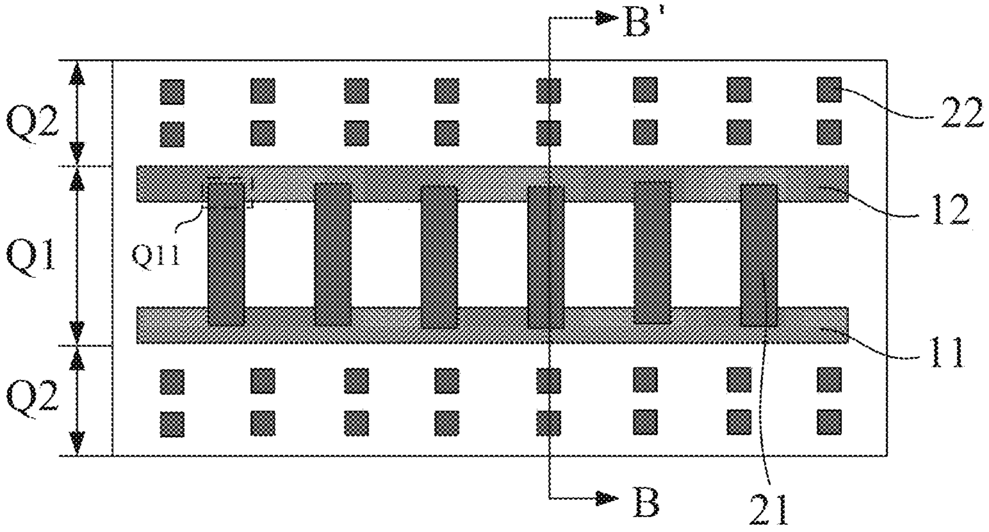
FIG. 3 is a top view of a phase shifter according to the present disclosure.
Figure 4:
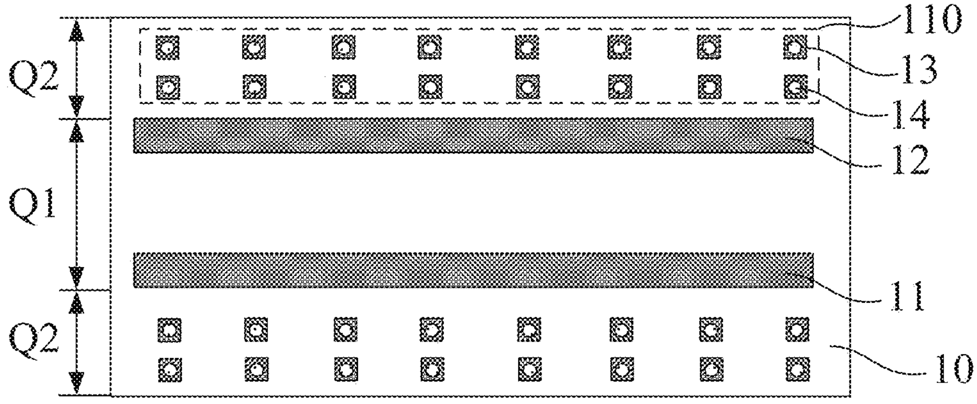
FIG. 4 is a plan view of a first substrate of the phase shifter shown in FIG. 3.
Figure 5:
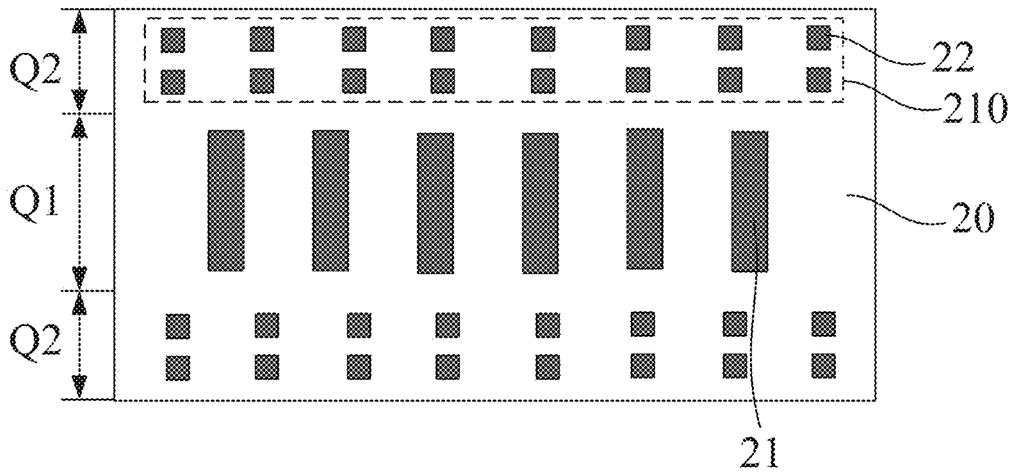
FIG. 5 is a plan view of a second substrate of the phase shifter shown in FIG. 3.
Figure 6:
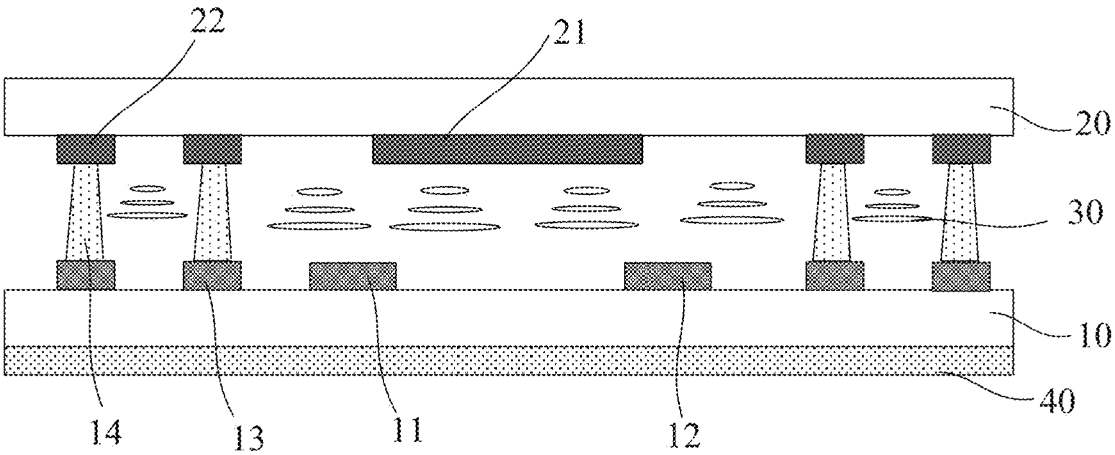
FIG. 6 is a cross-sectional view taken along B-B' in FIG. 3.

In a first aspect, the present disclosure provides a phase shifter. FIG. 3 is a top view of a phase shifter according to the present disclosure. FIG. 4 is a plan view of a first substrate of the phase shifter shown in FIG. 3 FIG. 5 is a plan view of a second substrate of the phase shifter shown in FIG. 3. FIG. 6 is a cross-sectional view taken along B-B' in FIG. 3; as shown in FIGS. 3 to 6, the phase shifter is at least divided into a phase shift region Q1 and a peripheral region Q2, and the phase shift region Q1 includes a plurality of overlapping regions Q11 arranged side by side in the transmission direction in which the microwave signal is transmitted. The phase shifter includes a first substrate and a second substrate disposed opposite to each other, and a liquid crystal layer 30 disposed between the first substrate and the second substrate. The first substrate includes a first dielectric substrate 10, a first electrode and a first auxiliary structure 110 arranged on a side of the first dielectric substrate 10 close to the liquid crystal layer 30; the first electrode is located in the phase shift region Q1, and the first auxiliary structure 110 is located in the peripheral region Q2. The second substrate includes a second dielectric substrate 20, a second electrode and a second auxiliary structure 210 arranged on a side, close to the liquid crystal layer 30, of the second dielectric substrate 20, the second electrode is located in the phase shift region Q1, and the second auxiliary structure 210 is located in the peripheral region Q2. Orthographic projections of the first electrode and the second electrode on the first dielectric substrate 10 are at least partially overlapped in the overlapping regions Q11 to form a plurality of capacitors. In the present disclosure, the dielectric layer includes, but is not limited to, the liquid crystal layer 30, and a case of the dielectric layer being the liquid crystal layer 30 is taken as an example for illustration. In this case, after the first electrode and the second electrode are applied with the DC bias voltage, an electric field is formed at least at an overlapping position at which the first electrode and the second electrode are overlapped, so that the dielectric constant of the liquid crystal layer 30 is changed, thereby achieving a phase shift on the microwave signal.

In the present disclosure, since the first auxiliary structure 110 and the second auxiliary structure 210 are additionally arranged on the first dielectric substrate 10 and the second dielectric substrate 20, the uniformity of thickness of the dielectric layer of the phase shifter can be effectively improved. Meanwhile, a space defined between the first dielectric substrate 10 and the second dielectric substrate 20 is partially occupied by the first auxiliary structure 110 and the second auxiliary structure 210, so that an amount of liquid crystal in the liquid crystal layer 30 can be reduced, and the cost of the phase shifter can be reduced.

In some examples, the first electrode in the phase shifter may include a first transmission line 11 and a second transmission line 12 arranged side by side and each extending in a transmission direction in which the microwave signal is transmitted; correspondingly, the second electrode may include a plurality of patch structures 21 arranged side by side in the transmission direction in which the microwave signal is transmitted. Orthographic projections of two end parts of each patch structure on the first dielectric substrate 10 are at least partially overlapped with orthographic projections of the first transmission line 11 and the second transmission line 12 on the first dielectric substrate 10, respectively, that is, a plurality of capacitors located at the overlapping regions Q11 are formed. In this case, by applying a DC bias voltage to the first transmission line 11, the second transmission line 12 and the patch structures, an electric field is formed at least at overlapping positions at which the patch structures and the first transmission line 11 are overlapped, and the patch structures and the second transmission line 12 are overlapped, to drive liquid crystal molecules of the liquid crystal layer 30 to deflect, to change the dielectric constant of the liquid crystal layer 30, thereby achieving a phase shift on microwave signals output from the first transmission line 11 and the second transmission line 12.

It should be noted that, the phase shifter may include a reference electrode 40 located on a side of the first dielectric substrate 10 or the second dielectric substrate 20 away from the liquid crystal layer 30, the reference electrode 40 may be a ground electrode, and both orthographic projections of the first electrode and the second electrode on the first dielectric substrate 10 are at least partially overlapped with an orthographic projection of the reference electrode 40 on the first dielectric substrate 10, so that the first electrode, the second electrode, and the reference electrode 40 can form a current loop. It will be appreciated that an operation of the phase shifter does not depend on the reference electrode 40, but for integrating the phase shifter in an antenna, one or more reference electrodes 40 may be provided.

Further, in response to that the phase shifter adopts the structure described above, both the first transmission line 11 and the second transmission line 12 may adopt a linear structure, and ends of the first transmission line 11 are aligned with ends of the second transmission line 12 respectively, and the first transmission line 11 and the second transmission line 12 have a same line width. Certainly, the first transmission line 11 and the second transmission line 12 may also be meandering lines, and shapes of the first transmission line 11 and the second transmission line 12 are not limited in the present disclosure.

Figure 7:
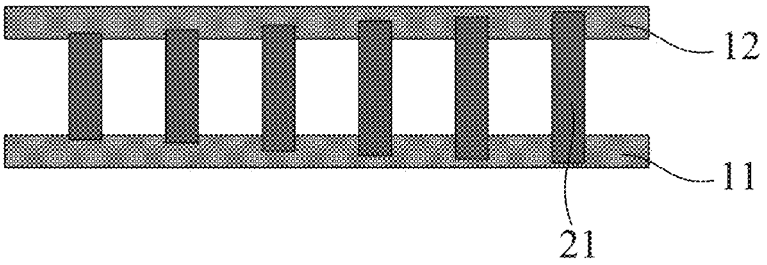
FIG. 7 is a partial schematic view of a phase shifter according to the present disclosure.

In some examples, the patch structures 21 may have a same structure, and in this case, each of the orthographic projections of the patch structures 21 on the first dielectric substrate 10 has the same area as the orthographic projection of the first transmission line 11 on the first dielectric substrate 10, and each of the orthographic projections of the patch structures 21 on the first dielectric substrate 10 has the same area as the orthographic projection of the second transmission line 12 on the second dielectric substrate 20. Further, for each patch structure 21, the patch structure 21 includes a first end part and a second end part disposed opposite to each other, an overlapping region at which the orthographic projection of the first end part on the first dielectric substrate 10 and the orthographic projection of the first transmission line 11 on the first dielectric substrate 10 are overlapped is a first region, an overlapping region at which orthographic projection of the second end part on the first dielectric substrate 10 and the orthographic projection of the second transmission line 12 on the first dielectric substrate 10 are overlapped is a second region, and areas of the first region and the second region are equal to each other. In some examples, FIG. 7 is a partial schematic view of a phase shifter according to the present disclosure; as shown in FIG. 7, the patch structures 21 may adopt different structures, in this case, at least partial of the overlapping regions of the orthogonal projections of the patch structures 21 and the first transmission line 11 on the first dielectric substrate 10 are different from each other in area, and at least partial of the overlapping regions of the orthogonal projections of the patch structures 21 and the second transmission line 12 on the second dielectric substrate 20 are different form each other in area. For example, for each patch structure 21, the patch structure 21 includes a first end part and a second end part disposed opposite to each other, an overlapping region at which the orthographic projection of the first end part on the first dielectric substrate 10 and the orthographic projection of the first transmission line 11 on the first dielectric substrate 10 are overlapped is a first region, an overlapping region at which the orthographic projection of the second end part on the first dielectric substrate 10 and the orthographic projection of the second transmission line 12 on the first dielectric substrate 10 are overlapped is a second region, and areas of the first region and the second region are equal to each other. Along the transmission direction in which the microwave signal is transmitted, areas of first regions are monotonically increased or monotonically decreased, and areas of second regions are monotonically increased or monotonically decreased. For example, widths of the patch structures 21 are equal to each other, and lengths of the patch structures 21 are different from each other, and the lengths of the first regions in the transmission direction in which the microwave signal is transmitted are monotonically increased or monotonically decreased; for another example, the patch structures 21 have lengths equal to each other and have widths different from each other, and the widths of the first regions in the transmission direction in which the microwave signal is transmitted are monotonically increased or monotonically decreased. Some examples of positional relationship between the first transmission line 11, the second transmission line 12 and the patch structures 21 are given above, but the present disclosure is not limited thereto. In some examples, for each patch structure 21, the patch structure 21 includes a first end part and a second end part disposed opposite to each other, an overlapping region at which an orthographic projection of the first end part on the first dielectric substrate 10 and the orthographic projection of the first transmission line 11 on the first dielectric substrate 10 are overlapped is a first region, an overlapping region at which an orthographic projection of the second end part on the first dielectric substrate 10 and the orthographic projection of the second transmission line 12 on the first dielectric substrate 10 are overlapped is a second region, and areas of the first region and the second region are different from each other. Other cases are not enumerated here one by one.

In some examples, the patch structures 21 are arranged at intervals equal to each other, and in some examples, the patch structures 21 are arranged at intervals not equal to each other, for example, in the transmission direction in which the microwave signal is transmitted, the interval between the patch structures 21 at any end is greater than the interval between the patch structures 21 in a middle. For another example, the intervals between the patch structures 21 increases monotonically or decreases monotonically along the transmission direction in which the microwave signal is transmitted.

Figure 8:
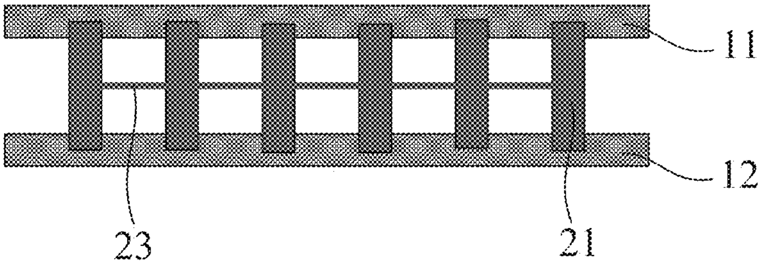
FIG. 8 is a partial schematic view of a phase shifter according to the present disclosure.

FIG. 8 is a partial schematic view of a phase shifter according to the present disclosure. As shown in FIG. 8, in response to that the phase shifter adopts the structure described above, the patch structures 21 may be connected together by a connection electrode 23, or may be controlled independently. In response to that the patch structures 21 are electrically connected together by the connection electrode 23, during the phase shifter operating, a DC bias voltage may be provided to the patch structures 21 through a bias voltage line, and thus, it is convenient to control the patch structures 21. In response to that the patch structures 21 are independently controlled, that is, each patch structure 21 is connected to a corresponding bias voltage line, during the phase shifter operating, a degree of phase shift may be adjusted by applying voltages to different bias voltage lines selected.

Figure 9:
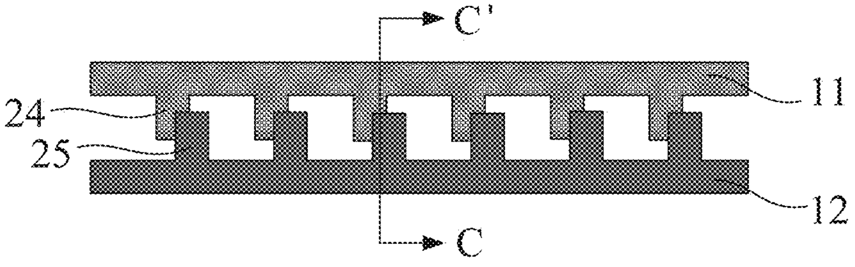
FIG. 9 is a partial schematic view of a phase shifter according to the present disclosure.
Figure 10:
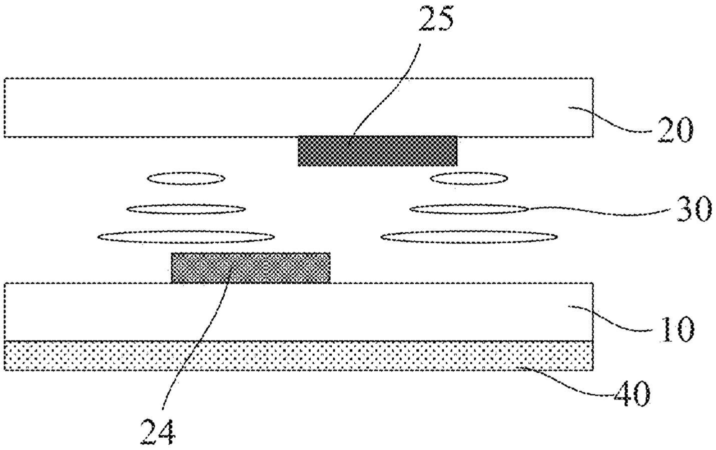
FIG. 10 is a cross-sectional view taken along C-C' in FIG. 9.

In some examples, FIG. 9 is a partial schematic view of a phase shifter according to the present disclosure; FIG. 10 is a cross-sectional view taken along C-C' in FIG. 9; as shown in FIGS. 9 and 10, the first electrode in the phase shifter includes a first transmission line 11 extending in the transmission direction in which the microwave signal is transmitted, and a plurality of first branches 24 connected to the first transmission line 11 and arranged side by side in the transmission direction in which the microwave signal is transmitted. The second electrode in the phase shifter includes a second transmission line 12 extending in the transmission direction in which the microwave signal is transmitted and a plurality of second branches 25 connected to the second transmission line 12 and arranged side by side in the transmission direction in which the microwave signal is transmitted. In some implementations, an orthographic projection of an end part of one first branch 24 away from the first transmission line 11 is at least partially overlapped with an orthographic projection of an end part of one second branch 25 away from the second transmission line 12 on the first dielectric substrate 10, to form a capacitor located in the overlapping region Q11. For example, the first branches 24 are arranged in correspondence with the second branches 25 one to one, and orthographic projections of the first branch 24 and the second branch 25, correspondingly arranged, on the first dielectric substrate 10 are at least partially overlapped. In the present disclosure, a case where the first branches 24 are arranged in correspondence with the second branches 25 one to one is taken as an example for illustration.

The first transmission line 11 and the second transmission line 12 may have the same structures as the first transmission line 11 and the second transmission line 12 described above, except that the first transmission line 11 and the second transmission line 12 described above are disposed on a same dielectric substrate, and the first transmission line 11 and the second transmission line 12 in these examples are disposed on different dielectric substrates respectively.

Further, lengths of the first branches 24 are equal to each other, widths of the first branches 24 are equal to each other, lengths of the second branches 25 are equal to each other, and widths of the second branches 25 are equal to each other, in this case, areas of overlapping regions in which orthographic projections of the first branches 24 on the first dielectric substrate 10 are respectively overlapped with orthographic projections of the second branches 25 on the first dielectric substrate 10 are equal to each other. In some examples, at least partial of areas of the overlapping regions in which the orthographic projections of the first branches 24 on the first dielectric substrate 10 are respectively overlapped with the orthographic projections of the second branches 25 on the first dielectric substrate 10 are not equal to each other, for example, in the transmission direction in which the microwave signal is transmitted, the areas of the overlapping regions in which the orthographic projections of the first branches 24 on the first dielectric substrate 10 are respectively overlapped with the orthographic projections of the second branches 25 on the first dielectric substrate 10 are monotonically increased or decreased. In an example, the first branches 24 have lengths equal to each other and have widths different from each other, and the second branches 25 have lengths equal to each other and have widths different from each other, so as to achieve that at least partial of the areas of overlapping regions in which the orthographic projections of the first branches 24 on the first dielectric substrate 10 are respectively overlapped with the orthographic projections of the second branches 25 on the first dielectric substrate 10 are not equal to each other. Alternatively, the first branches 24 have widths equal to each other and have lengths different from each other, and the second branches 25 have widths equal to each other and have lengths different from each other, so as to achieve that at least partial of the areas of the overlapping regions in which the orthographic projections of the first branches 24 on the first dielectric substrate 10 are respectively overlapped with the orthographic projections of the second branches 25 on the first dielectric substrate 10 are not equal to each other. The above only illustrates several implementations, but the scope of the present disclosure is not limited thereto.

It should be noted that, only several structures of the first electrode and the second electrode in the phase shifter are given above, but these are merely exemplary implementations, and do not constitute a limitation to the protection scope of the present disclosure, all implementations capable of implementing phase shifting on a microwave signal are within the protection scope of the present disclosure.

In an example, no matter which structure described above is adopted by the phase shifter, the first auxiliary structure 110 may include a plurality of first auxiliary sub-electrodes 13, and the first auxiliary sub-electrodes 13 and the first electrode are disposed in a same layer and are made of a same material; and/or, the second auxiliary electrode may include a plurality of second auxiliary sub-electrodes 22, and the second auxiliary sub-electrodes 22 and the second electrode are disposed in a same layer and are made of a same material. In this case, in response to that the first auxiliary structure 110 includes a plurality of first auxiliary sub-electrodes 13, the first auxiliary sub-electrodes 13 and the first electrode may be simultaneously formed on the first dielectric substrate 10 through an electroplating process, and thus during electroplating a metal film layer, electroplating is performed not only in the phase shift region Q1 but also in the peripheral region Q2, so that the uniformity of current is greatly improved, thereby improving uniformity of the film layer. Similarly, in response to that the second auxiliary structure 210 includes a plurality of second auxiliary sub-electrodes 22, the second auxiliary sub-electrodes 22 and the second electrode may be simultaneously formed on the second dielectric substrate 20 by an electroplating process, and thus during electroplating the metal film layer, electroplating is performed not only in the phase shift region Q1 but also in the peripheral region Q2, so that the uniformity of current is greatly improved, thereby improving uniformity of the film layer. In some implementations, the first auxiliary structure 110 includes a plurality of first auxiliary sub-electrodes 13 disposed in the same layer as the first electrode, and the second auxiliary structure 210 includes a plurality of second auxiliary sub-electrodes 22 disposed in the same layer as the second electrode, so as to improve the uniformity of the thickness of each of the first electrode and the second electrode to maximum extent, thereby improving the performance of the phase shifter. For convenience of description, a case where the first auxiliary structure 110 includes a plurality of first auxiliary sub-electrodes 13, and the second auxiliary structure 210 includes a plurality of second auxiliary sub-electrodes 22 is taken as an example for illustration.

In some examples, the phase shift region Q1 has an area S11; the peripheral region Q2 has an area S12; in response to that the first auxiliary structure 110 includes a plurality of first auxiliary sub-electrodes 13, an area of an orthographic projection of the first electrode on the first dielectric substrate 10 is equal to S13; an area of an orthographic projection of each first auxiliary sub-electrode 13 on the first dielectric substrate 10 is equal to S14; S13:S11=S14:S12. In this case, a metal pattern in the phase shift region Q1 is at the same ratio as a metal pattern in the peripheral region Q2, so that, during electroplating a metal film layer for forming the first electrode, the uniformity of thickness of the metal film layer is ensured, that is, the uniformity of thickness of the first electrode formed is ensured. Similarly, in the present disclosure, in response to that the second auxiliary structure 210 includes a plurality of second auxiliary sub-electrodes 22, an area of an orthographic projection of the second electrode on the second dielectric substrate 20 is equal to S15; an area of an orthographic projection of each second auxiliary sub-electrode 22 on the second dielectric substrate 20 is equal to S16; S15:S11=S16:S12. In this case, the uniformity of thickness of the second electrode formed by an electroplating process can also be ensured.

In some examples, in order to prevent the first auxiliary sub-electrodes 13 from interfering with the microwave signal transmitted by the first electrode, a minimum distance between each first auxiliary sub-electrode 13 and the first electrode (including the first transmission line 11) ranges from 400 μm to 900 μm. Similarly, in order to prevent the second auxiliary sub-electrodes 22 from interfering with the microwave signal transmitted by the first electrode, a minimum distance between each second auxiliary sub-electrode 22 and the second electrode (including the second transmission line 12) ranges from 400 μm to 900 μm. For example, the first auxiliary sub-electrodes 13 are arranged in an array, and the minimum distance between any first auxiliary sub-electrode in a column of the first auxiliary sub-electrodes 13 closest to the first electrode and the first electrode ranges from 400 μm to 900 μm. Similarly, the second auxiliary sub-electrodes 22 are arranged in an array, and the minimum distance between any second auxiliary sub-electrode in a column of the second auxiliary sub-electrodes 22 closest to the second electrode and the second electrode ranges from 400 μm to 900 μm.

Further, an orthographic projection of each first auxiliary sub-electrode 13 the first dielectric substrate 10 is completely overlapped with an orthographic projection of one second auxiliary sub-electrode 22 on the first dielectric substrate 10. For example, the first auxiliary sub-electrodes 13 are disposed in correspondence with the second auxiliary sub-electrodes 22 one to one. Therefore, a thickness of a liquid crystal cell formed by aligning and combining the first substrate and the second substrate can be effectively reduced, the liquid crystal material of the liquid crystal layer 30 can be reduced, and the cost is reduced, and the first auxiliary sub-electrodes 13 are formed in the peripheral region Q2 of the first dielectric substrate 10, and the second auxiliary sub-electrodes 22 are formed in the peripheral region Q2 of the second dielectric substrate 20, which is beneficial to improving the uniformity of thickness of the liquid crystal layer 30 formed and improving the performance of the phase shifter. In addition, the thickness of the liquid crystal cell of the phase shifter is maintained by spacers 14 located on the first substrate and the second substrate, each spacer 14 includes a first end face and a second end face which are arranged opposite to each other, an orthographic projection of the first end face of each spacer 14 on the first dielectric substrate 10 is located in the orthographic projection of one first auxiliary sub-electrode 13 on the first dielectric substrate 10, for example, an area of a surface of the first auxiliary sub-electrode 13 closest to the first end face is about 1.5 times of an area of the first end face. An orthographic projection of the second end face of each spacer 14 on the second dielectric substrate 20 is located in the orthographic projection of one second auxiliary sub-electrode 22 on the second dielectric substrate 20, for example, an area of a surface of the second auxiliary sub-electrode 22 closest to the second end face is about 1.5 times an area of the second end face. In such way, a stable support of each spacer 14 is ensured. To further ensure that the area of the first end face of each spacer 14 is greater than the area of the second end face of the spacer 14, in addition, in an actual product, as required by a phase shift amount, the area of the surface of the first auxiliary sub-electrode 13 closest to the first end face of the spacer 14 may be 2 times the area of the first end face, and the area of the surface of the second auxiliary sub-electrode 22 closest to the second end face of the spacer 14 may be 2 times the area of the second end face, and sizes of each first auxiliary sub-electrode 13 and each second auxiliary sub-electrode 22 may be set according to the phase shift amount and different application scenarios.

Figure 11:
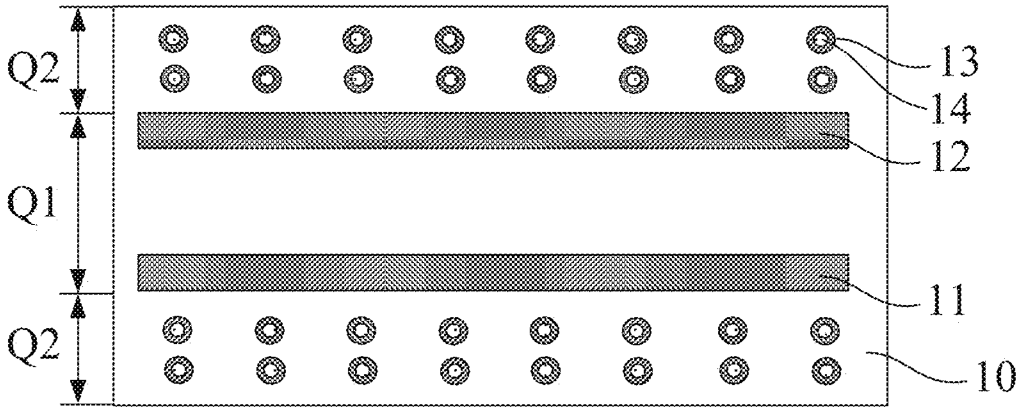
FIG. 11 is a plan view of a first substrate of the phase shifter shown in FIG. 3.

Further, in some examples, the first auxiliary sub-electrodes 13 are arranged in an array, and the second auxiliary sub-electrodes 22 are arranged in an array. For the first auxiliary sub-electrodes 13 each with the orthographic projection being located on a side of the phase shift region Q1 in the transmission direction in which the microwave signal is transmitted, intervals between very two adjacent first auxiliary sub-electrodes 13 located in a same row are equal to each other, and intervals between every two adjacent first auxiliary sub-electrodes 13 located in a same column are equal to each other. Similarly, for the second auxiliary sub-electrodes 22 each with the orthographic projection being located on a side of the phase shift region Q1 in the transmission direction in which the microwave signal is transmitted, intervals between every two adjacent second auxiliary sub-electrodes 22 located in a same row are equal to each other, and intervals between very two adjacent second auxiliary sub-electrodes 22 located in a same column are equal to each other. Further, each of the first auxiliary sub-electrodes 13 and each of the second auxiliary sub-electrodes 22 may adopt a regular polygon shape, a circular shape, or the like, which facilitates to avoid an occurrence of sharp corners causing a disturbance of current distribution. In FIG. 3, each of the first auxiliary sub-electrodes 13 and the second auxiliary sub-electrodes 22 is square, and the first auxiliary sub-electrodes 13 are disposed in correspondence with the second auxiliary sub-electrodes 22 one to one, in this case, for the first auxiliary sub-electrodes 13 each with the orthographic projection being located on the side of the phase shift region Q1 in the transmission direction in which the microwave signal is transmitted, each of the intervals between every two adjacent first auxiliary sub-electrodes 13 in each row and in each column may be about 200 μm, and the size of each of the first auxiliary sub-electrodes 13 and the second auxiliary sub-electrodes 22 is about 60 μm×60 μm. In FIG. 11, each of the first auxiliary sub-electrodes 13 and the second auxiliary sub-electrodes 22 is circular, and the first auxiliary sub-electrodes 13 are disposed in correspondence with the second auxiliary sub-electrodes 22 one to one, in this case, for the first auxiliary sub-electrodes 13 each with the orthographic projection being located on the side of the phase shift region Q1 in the transmission direction in which the microwave signal is transmitted, each of the intervals between every two adjacent first auxiliary sub-electrodes 13 in each row and in each column may be about 300 μm, and a diameter of each of the first auxiliary sub-electrodes 13 and the second auxiliary sub-electrodes 22 is about 60 μm.

In some examples, a first protective layer may be further formed on a side of the first auxiliary sub-electrodes 13 and the first electrode away from the first dielectric substrate 10, and a second protective layer may be further formed on a side of the second auxiliary sub-electrodes 22 and the second electrode away from the second dielectric substrate 20. The first protective layer and the second protective layer are formed to prevent the liquid crystal layer 30 formed between the first substrate and the second substrate, and an external environment from corroding metal film layers (including the first auxiliary sub-electrodes 13, the second auxiliary sub-electrodes 22, the first electrode and the second electrode, and the like) on the first substrate and the second substrate after the first substrate and the second substrate are aligned and combined into a cell. In addition, the spacers 14 are usually formed after the first protective layer and the second protective layer being formed, and an adhesion of the spacers 14 can be enhanced through the first protective layer and the second protective layer, so as to prevent the spacers 14 from falling off. Further, a material of the first protective layer and the second protective layer includes, but is not limited to, nitrides.

Certainly, for any phase shifter described above, the phase shifter may include not only the structure mentioned above, but also a first bias voltage line for providing a DC bias voltage to the first electrode, a second bias voltage line for providing a DC bias voltage to the second electrode, a first alignment layer disposed on a side of the spacers 14 away from the first dielectric substrate 10, a second alignment layer disposed on a side of the second protective layer away from the second dielectric substrate 20, and the like, which are not listed here.

Figure 12:
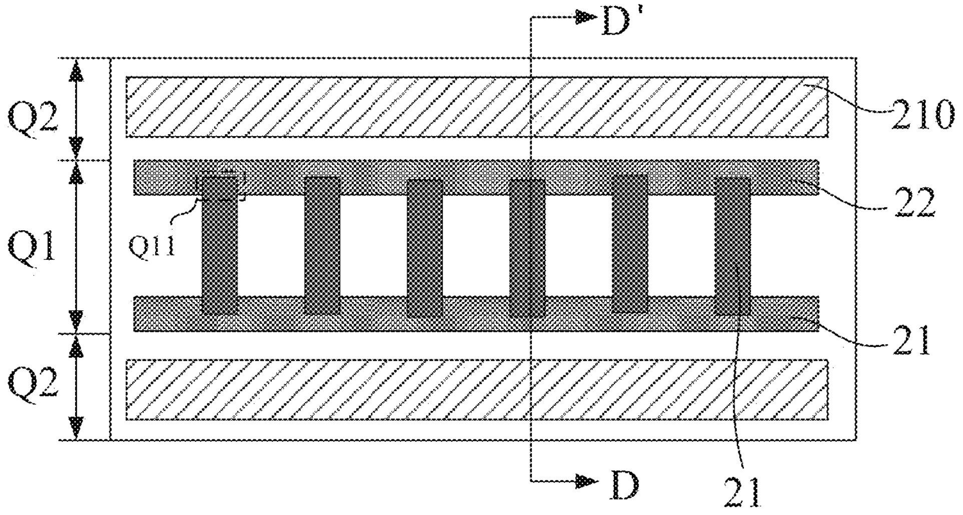
FIG. 12 is a top view of a phase shifter according to the present disclosure.
Figure 13:
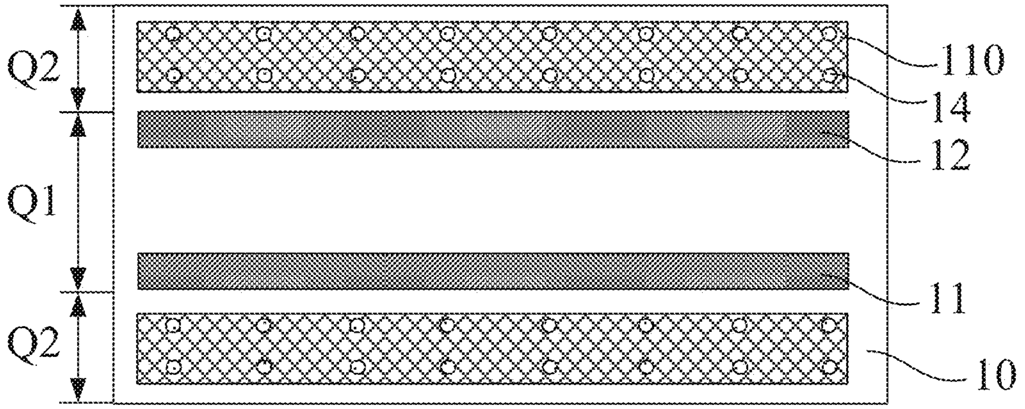
FIG. 13 is a plan view of a first substrate of the phase shifter shown in FIG. 12.
Figure 14:
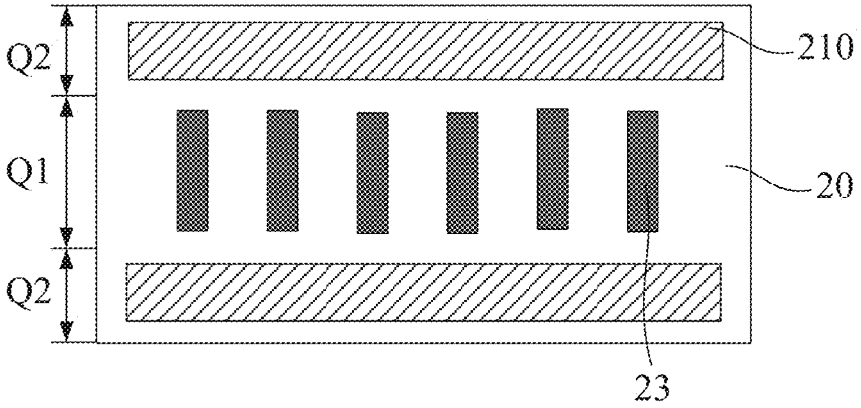
FIG. 14 is a plan view of a second substrate of the phase shifter shown in FIG. 12.
Figure 15:
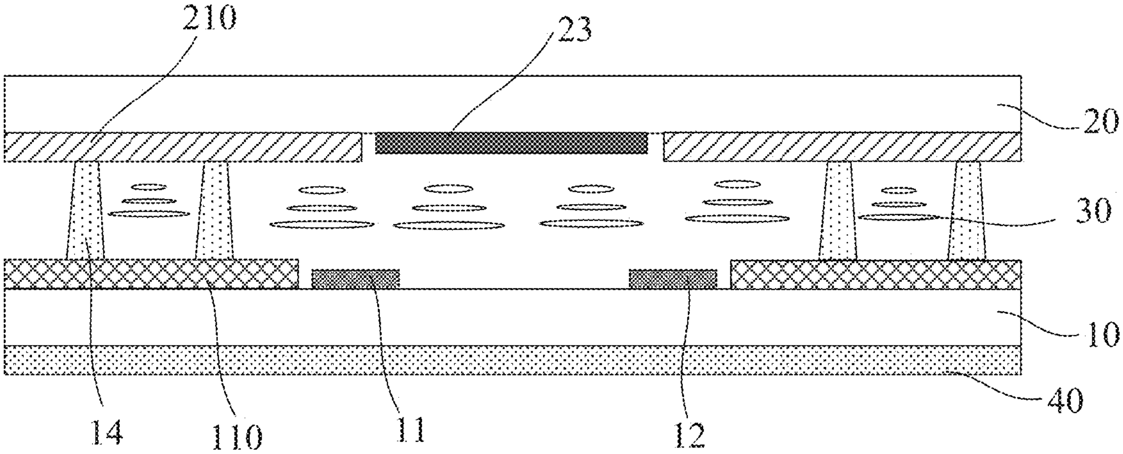
FIG. 15 is a cross-sectional view taken along D-D' in FIG. 12.

In another example, FIG. 12 is a top view of a phase shifter according to the present disclosure; FIG. 13 is a top view of a first substrate of the phase shifter shown in FIG. 12; FIG. 14 is a plan view of a second substrate of the phase shifter shown in FIG. 12; FIG. 15 is a cross-sectional view taken along D-D' in FIG. 12; as shown in FIGS. 12 to 15, no matter which structure described above is adopted by the first electrode and the second electrode in the phase shifter, both the first auxiliary structure 110 and the second auxiliary structure 210 are made of organic resin material with a dielectric constant being about 3.6. Both the first auxiliary structure 110 and the second auxiliary structure 210 each with the orthographic projection on the side of the phase shift region Q1 in the transmission direction in which the microwave signal is transmitted, are planar structures. By disposing the first auxiliary structure 110 and the second auxiliary structure 210 in planar structures in the peripheral region Q2 of the phase shifter, a height difference between the phase shift region Q1 and the peripheral region Q2 of the first substrate of the phase shifter and a height difference between the phase shift region Q1 and the peripheral region Q2 of the second substrate of the phase shifter are reduced, so that the thickness of the liquid crystal layer 30 formed between the first substrate and the second substrate is more uniform, the performance of the phase shifter can be further improved, and in addition, since the first auxiliary structure 110 and the second auxiliary structure 210 are disposed in the peripheral region Q2, the material of the liquid crystal layer 30 can be relatively reduced, and thus the cost can be reduced.

In some examples, with continued reference to FIG. 15, the thickness of the first auxiliary structure 110 in the phase shifter is not less than the thickness of the first electrode, and the thickness of the second auxiliary structure 210 is not less than the thickness of the second electrode. In some implementations, the thickness of the first auxiliary structure 110 is greater than the thickness of the first electrode by at least 0.3 μm, or the thickness of the first auxiliary structure 110 is greater than the thickness of the first electrode by 0.3 μm to 0.7 μm, for example, the thickness of the first auxiliary structure 110 is greater than the thickness of the first electrode by 0.5 μm, the thickness of the second auxiliary structure 210 is greater than the thickness of the second electrode by at least 0.3 μm, or the thickness of the second auxiliary structure 210 is greater than the thickness of the second electrode by 0.3 μm to 0.7 μm, for example the thickness of the second auxiliary structure 210 is greater than the thickness of the second electrode by 0.5 μm, since the peripheral region Q2 is a non-functional region, the first auxiliary structure 110 and the second auxiliary structure 210 being disposed in the peripheral region Q2 serve as operating elements, and each have a slightly large thickness, which can effectively reduce consumption of material of the liquid crystal layer 30, thereby reducing the cost.

In some examples, the minimum distance between each first auxiliary structure 110 and the first electrode ranges from about 150 μm to 900 μm, and similarly, the minimum distance between each second auxiliary structure 210 and the first electrode ranges from about 150 μm to 900 μm. That is, a certain clearance region (a position at which no element is disposed) is defined between the phase shift region Q1 and the peripheral section Q2 of the phase shifter, and it is found from process and simulation experiments that the performance of the phase shifter with such structure is better.

In some examples, the phase shifter may include not only the structure described above but also a first mark pattern and a first buffer layer sequentially disposed in a direction away from the first dielectric substrate 10, and a second mark pattern and a second buffer layer sequentially disposed in a direction away from the second dielectric substrate 20. The first buffer layer is arranged between the first mark pattern and a layer where the first electrode is located, and the second buffer layer is arranged between the second mark pattern and a layer where the second electrode is located. An orthographic projection of the first mark pattern on the first dielectric substrate 10 completely overlaps with the orthographic projection of the first electrode on the first dielectric substrate 10, and an orthographic projection of the second mark pattern on the second dielectric substrate 20 completely overlaps with the orthographic projection of the second electrode on the second dielectric substrate 20. The first mark pattern is a mark for subsequently preparing the first electrode, and the second mark pattern is a mark for subsequently preparing the second electrode. The first buffer layer and the second buffer layer mainly reduce an influence on a degree of phase shift and an insertion loss of the phase shifter. In some examples, the first mark pattern and the second mark pattern may be obtained by patterning an aluminum metal film layer and a molybdenum metal film layer laminated. The first buffer layer and the second buffer layer each may adopt a silicon nitride film layer with a dielectric constant ranging from 2 to 4.

In some examples, the phase shifter further includes a first negative stress film layer disposed on a side of the first electrode away from the first dielectric substrate 10, and a second negative stress layer disposed on a side of the second electrode away from the second dielectric substrate 20. The first auxiliary structure 110 is located on a side of the first negative stress film layer away from the first dielectric substrate 10, and the second auxiliary structure 210 is located on a side of the second negative stress layer away from the second dielectric substrate 20. The first negative stress film layer is configured to relieve internal stress caused by the first electrode, and the second negative stress layer is configured to relieve internal stress caused by the second electrode.

Certainly, the phase shifter further includes spacers 14 arranged between the first substrate and the second substrate, a first alignment layer arranged on a side of the spacers 14 away from the first dielectric substrate 10, a second alignment layer arranged on a side of the spacers 14 away from the second dielectric substrate 20, and the like. Each of the orthographic projections of the first auxiliary structure 110 and the second auxiliary structure 210 on the first dielectric substrate 10 covers the orthographic projections of the spacers 14 on the first dielectric substrate 10.

Figure 16:
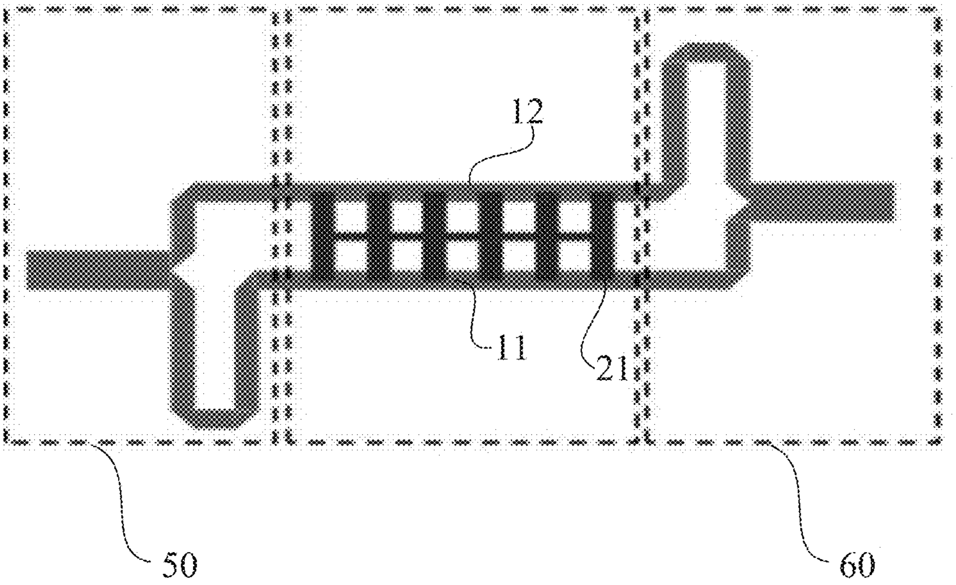
FIG. 16 is a partial schematic view of a phase shifter according to the present disclosure.

In some examples, as shown in FIG. 16, the phase shifter includes not only the structure described above but also a first feeding structure 50 and a second feeding structure 60. Taking a case where the first electrode in the phase shifter includes the first transmission line 11 and the second transmission line 12, and the second electrode includes a plurality of patch structures 21 as an example, an end of each of the first transmission line 11 and the second transmission line 12 is electrically connected to the first feeding structure 50, and another end of each of the first transmission line 11 and the second transmission line 12 is electrically connected to the second feeding structure 60. Both the first feeding structure 50 and the second feeding structure 60 may adopt BALUN components. It should be noted that each BALUN (Balance-unbalance) component is a three-port device, which may be applied to a microwave radio frequency device, and the BALUN component is a radio frequency transmission line transformer that converts a matching input into a differential input, and may be used for exciting a differential line, an amplifier, a broadband antenna, a balanced mixer, a balanced frequency multiplier, a modulator, a phase shifter, or any circuit design for transmitting signals with amplitudes equal to each other and a phase difference of 180°. Two outputs of the BALUN component have amplitudes equal to each other and phases opposite to each other, which means that, in the frequency domain, there is a phase difference of 180° between the two outputs; and in the time domain, a voltage of one balanced output is a negative value of that of the other balanced output.

For example, each of the first feeding structure 50 and the second feeding structure 60 is the BALUN component, the first feeding structure 50 includes a first main path, a first branch and a second branch, and the second feeding structure 60 includes a second main path, a third branch and a fourth branch. The first branch and the fourth branch are in a shape of a straight line, and the second branch and the third branch are in a shape of a meandering line. Taking the first main path serves as an input port and the second main path serves as an output port as an example, the microwave signal fed in through the first main path is divided into two paths to be respectively fed into the first transmission line 11 and the second transmission line 12 of the phase shifter through the first branch and the second branch, a phase difference between the microwave signal fed in through the second branch and the microwave signal fed in through the first branch is equal to 180°, microwave signals are respectively transmitted to the third branch and the fourth branch by the first transmission line 11 and the second transmission line 12, and then the microwave signals are restored and output as microwave signals with a same phase and a same amplitude, and are fed out through the second main path.

In an example, the phase shifter further includes a third dielectric substrate, and the first feeding structure 50 and the second feeding structure 60 are disposed on the third dielectric substrate. One of the first dielectric substrate 10 and the second dielectric substrate 20 is attached to the third dielectric substrate. In the present disclosure, the third dielectric substrate is attached to a side of the first dielectric substrate 10 away from the liquid crystal layer 30, the first feeding structure 50 and the second feeding structure 60 are both disposed on a side of the third dielectric substrate away from the liquid crystal layer 30, and a first opening, a second opening, a third opening, and a fourth opening are disposed in the third dielectric substrate, an end of the first transmission line 11 is coupled to the first branch of the first feeding structure 50 through the first opening, and another end of the first transmission line 11 is coupled to the third branch of the second feeding structure 60 through the second opening. An end of the second transmission line 12 is coupled to the second branch of the first feeding structure 50 through the third opening, and another end of the second transmission line 12 is coupled to the fourth branch of the second feeding structure 60 through the fourth opening. In some implementations, the third dielectric substrate may be a Printed Circuit Board (PCB).

In a second aspect, the present disclosure provides a method for manufacturing a phase shifter, which may be used to manufacture any phase shifter described above. The method includes forming a first substrate and a second substrate, aligning and combining the first substrate and the second substrate into a cell, and filling a dielectric layer between the first substrate and the second substrate. The phase shifter has a phase shift region Q1 and a peripheral region Q2, the phase shift region Q1 includes at least one group of overlapping regions Q11, and each group includes a plurality of overlapping regions Q11 arranged at intervals along a transmission direction in which a microwave signal is transmitted. The first substrate and the second substrate may be formed by following steps.

The step of forming the first substrate includes: forming a first dielectric substrate 10, and forming a first electrode and a first auxiliary structure 110 on the first dielectric substrate 10, with the first electrode being located in the phase shift region Q1, and the first auxiliary structure 110 being located in the peripheral region Q2.

The step of forming the second substrate includes: forming a second dielectric substrate 20; and forming a second electrode and a second auxiliary structure 210 on the second dielectric substrate 20, with the second electrode being located in the phase shift region Q1, the second auxiliary structure 210 being located in the peripheral region Q2, and orthographic projections of the first electrode and the second electrode in the overlapping regions Q11 being at least partially overlapped to form a plurality of capacitors.

In order to make the method in the present disclosure clear, a case where the first electrode includes a first transmission line 11 and a second transmission line 12 each extending in the transmission direction in which the microwave signal is transmitted, and the second electrode includes a plurality of patch structures arranged side by side along the transmission direction in which the microwave signal is transmitted is taken as an example. The dielectric layer is a liquid crystal layer 30. The method for manufacturing the phase shifter according to the present disclosure is illustrated below by taking a case where the first auxiliary structure 110 includes a plurality of first auxiliary sub-electrodes 13 disposed in the same layer as the first transmission line 11 and the second transmission line 12, and the second auxiliary structure 210 includes a plurality of second auxiliary sub-electrodes 22 disposed in the same layer as the patch structures 21; or a case where both the first auxiliary structure 110 and the second auxiliary structure 210 are made of an organic resin material, as an example.

In a first example, the method of manufacturing the phase shifter includes steps of forming a first substrate and a second substrate, and forming a liquid crystal layer 30 between the first substrate and the second substrate.

Figure 17:
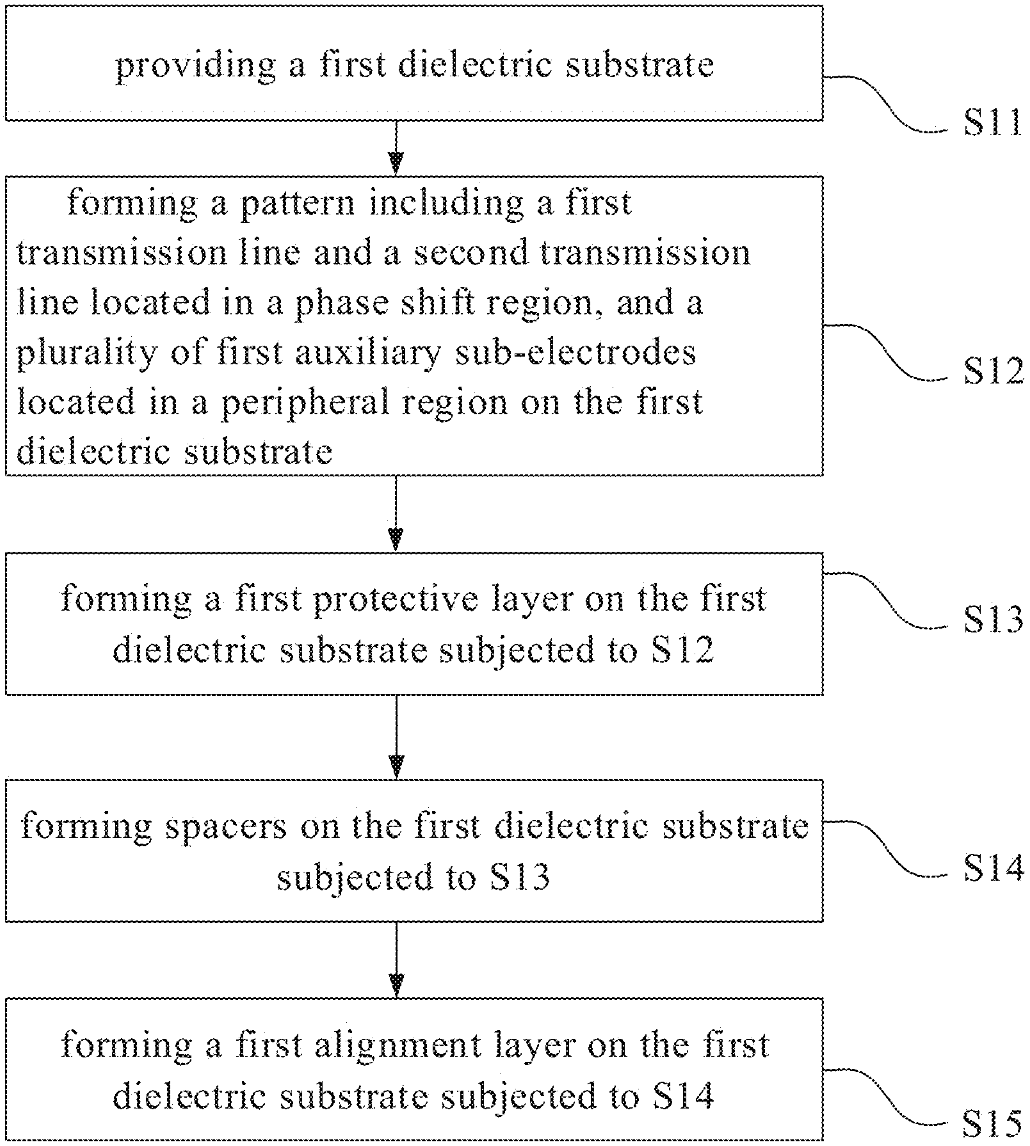
FIG. 17 is a flowchart illustrating a method for manufacturing a first substrate of a phase shifter according to the present disclosure.

As shown in FIG. 17, the step of forming the first substrate may include following steps S11 to S15.

At step S11, providing a first dielectric substrate 10.

The first dielectric substrate 10 includes, but is not limited to, a glass substrate.

At step S12, forming a pattern including a first transmission line 11 and a second transmission line 12 located in a phase shift region Q1, and a plurality of first auxiliary sub-electrodes 13 located in a peripheral region Q2 on the first dielectric substrate 10.

In some examples, the step S12 may include forming a first metal film layer as a seed layer on the first dielectric substrate 10, performing electroplating on the seed layer, and then forming a pattern including the first transmission line 11 and the second transmission line 12 located in the phase shift region Q1 and the plurality of first auxiliary sub-electrodes 13 located in the peripheral region Q2 through an etching process.

At step S13, forming a first protective layer on the first dielectric substrate 10 subjected to the step S12.

A material of the first protective layer includes, but is not limited to, nitride.

At step S14, forming spacers 14 on the first dielectric substrate 10 subjected to the step S13.

At step S15, forming a first alignment layer on the first dielectric substrate 10 subjected to the step S14.

In some examples, the step S15 may include forming the first alignment layer through an Inkjet process, and performing optical-aligning on the first alignment layer by an optical alignment (OA) device, which can ensure uniformity of formation of the first alignment layer.

So far, the first substrate is prepared. It should be noted that the step of forming the first substrate further includes a step of forming a bias voltage line for supplying a bias voltage signal to the first transmission line 11 and the second transmission line 12, which may be performed before forming the first transmission line 11 and the second transmission line 12.

Figure 18:
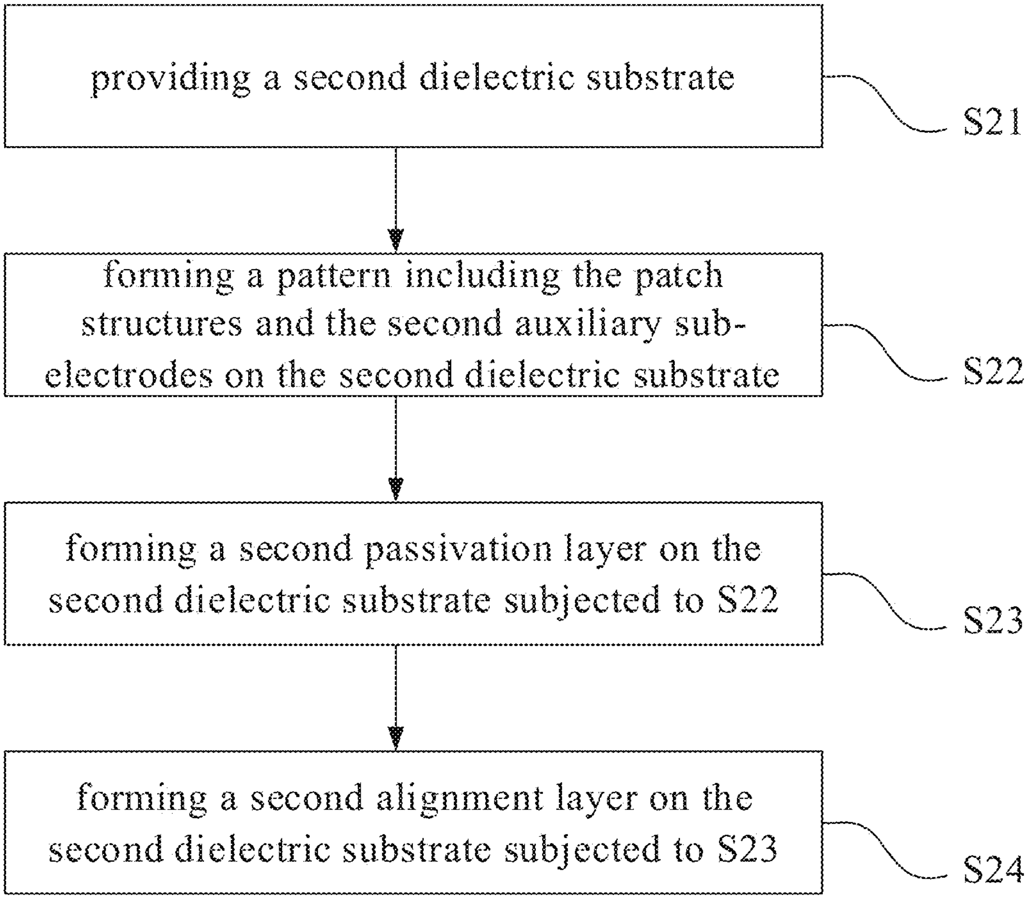
FIG. 18 is a flowchart illustrating a method for manufacturing a second substrate of a phase shifter according to the present disclosure.

As shown in FIG. 18, the step of forming the second substrate includes following steps S21 to S24.

At step S21, providing a second dielectric substrate 20.

The second dielectric substrate 20 includes, but is not limited to, a glass substrate.

At step S22, forming a pattern including the patch structures 21 and the second auxiliary sub-electrodes 22 on the second dielectric substrate 20.

In some examples, the step S22 may include forming a second metal film layer as a seed layer on the second dielectric substrate 20, then performing electroplating on the seed layer, and forming a pattern including the patch structures 21 and the second auxiliary sub-electrodes 22 through an etching process.

At step S23, forming a second protective layer on the second dielectric substrate 20 subjected to the step S22.

A material of the second protective layer includes, but is not limited to, nitride.

At step S24, forming a second alignment layer on the second dielectric substrate 20 subjected to the step S23.

In some examples, the step S24 may include forming the second alignment layer through an Inkjet process, and performing optical-aligning on the second alignment layer by an optical alignment (OA) device, which may ensure uniformity of formation of the second alignment layer.

So far, the second substrate is prepared. It should be noted that the step of forming the second substrate further includes a step of forming a bias voltage line for providing a bias voltage signal to the patch structures 21, which may be performed before forming the patch structures 21.

In a second example, the method for manufacturing the phase shifter includes steps of forming a first substrate and a second substrate, and forming a liquid crystal layer 30 between the first substrate and the second substrate.

Figure 19:
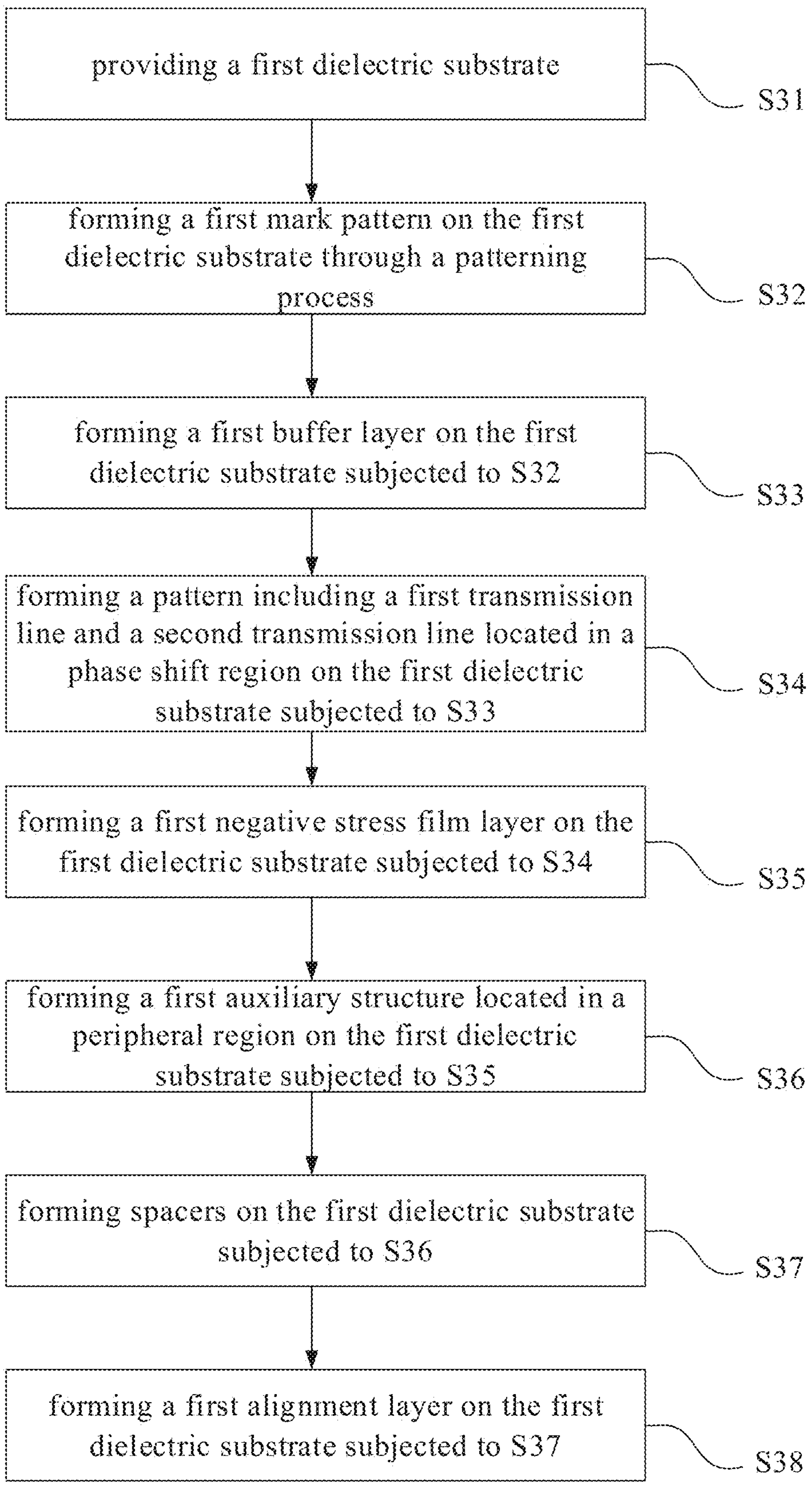
FIG. 19 is a flowchart illustrating a method for manufacturing a first substrate of a phase shifter according to the present disclosure.

As shown in FIG. 19, the step of forming the first substrate may include following steps S31 to S38.

At step S31, providing a first dielectric substrate 10.

The first dielectric substrate 10 includes, but is not limited to, a glass substrate.

At step S32, forming a first mark pattern on the first dielectric substrate 10 through a patterning process.

In some examples, the step S32 may include depositing an aluminum metal film layer and a molybdenum metal film layer successively on the first dielectric substrate 10 by a Physical Vapor Deposition (PVD) process, and then forming the first mark pattern by processes of exposure, development and etching.

At step S33, forming a first buffer layer on the first dielectric substrate 10 subjected to the step S32.

In some examples, the step S33 may include forming the first buffer layer on a side of the first mark pattern away from the first dielectric substrate 10 by a Chemical Vapor Deposition (CVD) process. A material of the first buffer layer includes, but is not limited to, silicon nitride, and a dielectric constant of the silicon nitride is controlled to be between 2 and 4.

At step S34, forming a pattern including a first transmission line 11 and a second transmission line 12 located in a phase shift region Q1 on the first dielectric substrate 10 subjected to the step S33.

In some examples, the step S34 may include forming a first metal film layer as a seed layer on the first dielectric substrate 10, and performing electroplating on the seed layer, then forming the first transmission line 11 and the second transmission line 12 in the phase shift region Q1 through an etching process.

At step S35, forming a first negative stress film layer on the first dielectric substrate 10 subjected to the step S34.

At step S36, forming a first auxiliary structure 110 located in a peripheral region Q2 on the first dielectric substrate 10 subjected to the step S35.

In some examples, the step S36 may include forming an organic resin material in the peripheral region Q2 through a spraying process, and leveling a surface of the first auxiliary structure 110 through a spin coating process.

At step S37, forming spacers 14 on the first dielectric substrate 10 subjected to the step S36.

At step S38, forming a first alignment layer on the first dielectric substrate 10 subjected to the step S37.

In some examples, the step S38 may include forming the first alignment layer through an Inkjet process, and performing optical-aligning on the first alignment layer by an optical alignment (OA) device, which may ensure uniformity of formation of the first alignment layer.

So far, the first substrate is prepared. It should be noted that the step of forming the first substrate further includes a step of forming a bias voltage line for supplying a bias voltage signal to the first transmission line 11 and the second transmission line 12, which may be performed before forming the first transmission line 11 and the second transmission line 12.

Figure 20:
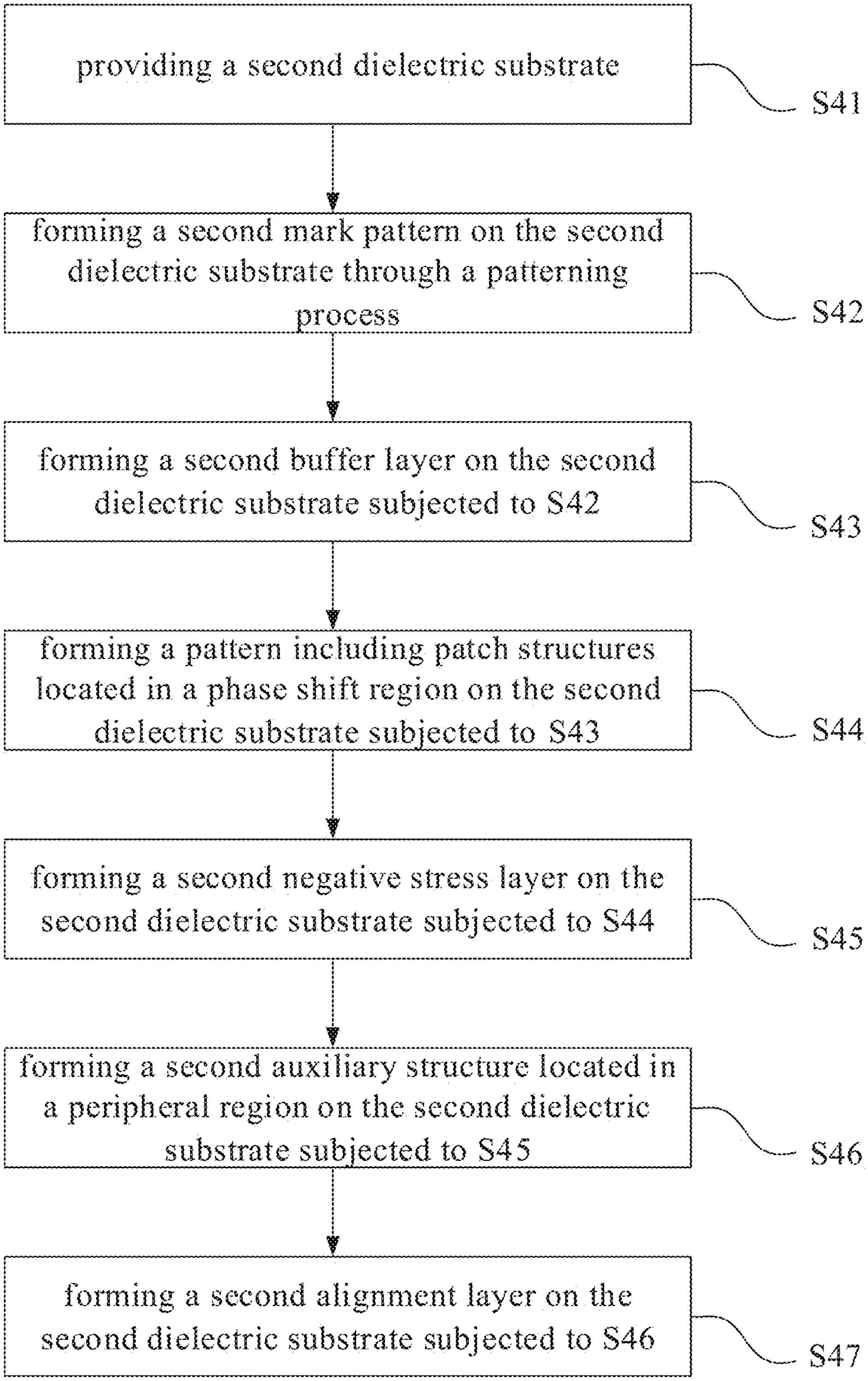
FIG. 20 is a flowchart illustrating a method for manufacturing a second substrate of a phase shifter according to the present disclosure.

As shown in FIG. 20, the step of forming the second substrate includes following steps S41 to S47.

At step S41, providing a second dielectric substrate 20.

The second dielectric substrate 20 includes, but is not limited to, a glass substrate.

At step S42, forming a second mark pattern on the second dielectric substrate 20 through a patterning process.

In some examples, the step S42 may include depositing an aluminum metal film layer and a molybdenum metal film layer successively on the second dielectric substrate 20 by a PVD process, and then forming the second mark pattern by processes of exposure, development and etching.

At step S43, forming a second buffer layer on the second dielectric substrate 20 subjected to the step S42.

In some examples, the step S43 may include forming the second buffer layer on a side of the second mark pattern away from the second dielectric substrate 20 by a CVD process. A material of the first buffer layer includes, but is not limited to, silicon nitride, and a dielectric constant of the silicon nitride is controlled to be between 2 and 4.

At step S44, forming a pattern including patch structures 21 located in a phase shift region Q1 on the second dielectric substrate 20 subjected to the step S43.

In some examples, the step S44 may include forming a second metal film layer as a seed layer on the second dielectric substrate 20, and performing electroplating on the seed layer, then forming the patch structures 21 by an etching process.

At step S45, forming a second negative stress layer on the second dielectric substrate 20 subjected to the step S44.

At step S46, forming a second auxiliary structure 210 located in a peripheral region Q2 on the second dielectric substrate 20 subjected to the step S45.

In some examples, the step S46 may include forming an organic resin material in the peripheral region Q2 through a spraying process, and leveling a surface of the second auxiliary structure 210 through a spin coating process.

At step S47, forming a second alignment layer on the second dielectric substrate 20 subjected to the step S46.

In some examples, the step S47 may include forming the second alignment layer through an Inkjet process, and performing optical-aligning on the second alignment layer by an OA device, which may ensure uniformity of formation of the second alignment layer.

So far, the second substrate is prepared. It should be noted that the step of forming the second substrate further includes a step of forming a bias voltage line for providing a bias voltage signal to the patch structures 21, which may be performed before forming the patch structures 21.

In a third aspect, the present disclosure further provides an antenna, which includes the phase shifter described above. An antenna system provided by the present disclosure further includes a transceiver unit, a radio frequency transceiver, a signal amplifier, a power amplifier and a filter unit. The antenna in the antenna system may be used as a transmitting antenna or a receiving antenna. The transceiver unit may include a baseband and a receiver terminal, the baseband provides a signal in at least one frequency band, for example, provides a 2G signal, a 3G signal, a 4G signal, a 5G signal, or the like, and sends the signal in the at least one frequency band to the radio frequency transceiver. After receiving the signal, the antenna in the antenna system may transmit the signal to the receiver terminal in the transceiver unit after the signal being processed by the filter unit, the power amplifier, the signal amplifier, and the radio frequency transceiver, the receiver terminal may be, for example, an intelligent gateway.

Furthermore, the radio frequency transceiver is connected to the transceiver unit, and is configured to modulate the signal sent by the transceiver unit, or demodulate a signal received by the antenna and transmit the modulated signal to the transceiver unit. Specifically, the radio frequency transceiver may include a transmitting circuit, a receiving circuit, a modulating circuit, and a demodulating circuit, after the transmitting circuit receives multiple types of signals provided by the baseband, the modulating circuit may modulate the multiple types of signals provided by the baseband, and then send the modulated signals to the antenna. The antenna receives the signals and transmits the signals to the receiving circuit of the radio frequency transceiver, the receiving circuit transmits the signals to the demodulating circuit, and the demodulating circuit demodulates the signals and transmits the demodulated signals to the receiver terminal.

Furthermore, the radio frequency transceiver is connected with the signal amplifier and the power amplifier, the signal amplifier and the power amplifier are further connected with the filter unit, and the filter unit is connected with at least one antenna. In a process of transmitting a signal by the antenna system, the signal amplifier is configured to improve a signal-to-noise ratio of the signal output by the radio frequency transceiver and then transmit the signal to the filter unit, the power amplifier is configured to amplify a power of the signal output by the radio frequency transceiver and then transmit the signal to the filter unit; the filter unit includes a duplexer and a filtering circuit, combines signals output by the signal amplifier and the power amplifier and filters noise waves out and then transmits a signal to the antenna, and the antenna radiates the signal out. In a process of receiving a signal by the antenna system, the signal received by the antenna is transmitted to the filter unit, the filter unit filters noise waves out of the signal received by the antenna and then transmits the signal to the signal amplifier and the power amplifier, the signal amplifier gains the signal received by the antenna to increase the signal-to-noise ratio of the signal; the power amplifier amplifies the power of the signal received by the antenna. The signal received by the antenna is processed by the power amplifier and the signal amplifier and then transmitted to the radio frequency transceiver, and the radio frequency transceiver then transmits the signal to the transceiver unit.

In some examples, the signal amplifier may include various types of signal amplifiers, for example, a low noise amplifier, which is not limited in the present disclosure.

In some examples, the antenna system provided by the present disclosure further includes a power management unit, connected to the power amplifier, for providing the power amplifier with a voltage for amplifying the signal.

It should be understood that the above exemplary implementations are merely adopted to illustrate the principles of the present disclosure, and the present disclosure is not limited thereto. It will be apparent to those skilled in the art that various modifications and improvements may be made without departing from the spirit and scope of the present disclosure, and such modifications and improvements are considered to be within the scope of the present disclosure.

The invention claimed is:

1. A phase shifter, comprising a first substrate and a second substrate disposed opposite to each other, and a dielectric layer disposed between the first substrate and the second substrate; the first substrate comprises a first dielectric substrate and a first electrode arranged on a side of the first dielectric substrate close to the dielectric layer; the second substrate comprises a second dielectric substrate and a second electrode arranged on a side of the second dielectric substrate close to the dielectric layer;

the phase shifter has a phase shift region and a peripheral region; the phase shift region comprises at least one group of overlapping regions, and each group comprises a plurality of overlapping regions arranged at intervals along a transmission direction in which a microwave signal is transmitted; the first electrode and the second electrode are both located in the phase shift region, and orthographic projections of the first electrode and the second electrode on the first dielectric substrate are overlapped at least partially in the overlapping regions to form a plurality of capacitors;

the phase shifter further comprises a first auxiliary structure and a second auxiliary structure; the first auxiliary structure is located in the peripheral region and arranged on a side, close to the dielectric layer, of the first dielectric substrate; the second auxiliary structure is located in the peripheral region and arranged on a side, close to the dielectric layer, of the second dielectric substrate.

2. The phase shifter of claim 1, wherein the first auxiliary structure comprises a plurality of first auxiliary sub-electrodes, and the first auxiliary sub-electrodes and the first electrode are arranged in a same layer and made of a same material; and/or the second auxiliary structure comprises a plurality of second auxiliary sub-electrodes, and the second auxiliary sub-electrodes and the second electrode are arranged in a same layer and made of a same material.

3. The phase shifter of claim 2, wherein an area of the phase shift region is equal to S11; an area of the peripheral region is equal to S12; in response to that the first auxiliary structure comprises a plurality of first auxiliary sub-electrodes, an area of an orthographic projection of the first electrode on the first dielectric substrate is equal to S13; an area of an orthographic projection of each first auxiliary sub-electrode on the first dielectric substrate is equal to S14, S13:S11=S14:S12; and/or in response to that the second auxiliary structure comprises a plurality of second auxiliary sub-electrodes, an area of an orthographic projection of the second electrode on the second dielectric substrate is equal to S15; an area of an orthographic projection of each second auxiliary sub-electrode on the second dielectric substrate is equal to S16, S15:S11=S16:S12.

4. The phase shifter of claim 2, wherein in response to that the first auxiliary structure comprises a plurality of first auxiliary sub-electrodes, a thickness of each first auxiliary sub-electrode is equal to that of the first electrode;

in response to that the second auxiliary structure comprises a plurality of second auxiliary sub-electrodes, a thickness of each second auxiliary sub-electrode is equal to that of the second electrode.

5. The phase shifter of claim 2, wherein in response to that the first auxiliary structure comprises a plurality of first auxiliary sub-electrodes and the second auxiliary structure comprises a plurality of second auxiliary sub-electrodes, an orthographic projection of each first auxiliary sub-electrode on the first dielectric substrate is overlapped with an orthographic projection of one second auxiliary sub-electrode on the first dielectric substrate.

6. The phase shifter of claim 4, wherein a center of an orthographic projection of each first auxiliary sub-electrode on the first dielectric substrate is coincident with a center of an orthographic projection of one second auxiliary sub-electrode on the first dielectric substrate.

7. The phase shifter of claim 2, further comprising:

a plurality of spacers arranged at intervals between the first substrate and the second substrate;

each spacer comprises a first end face and a second end face arranged opposite to each other, and the first end face is closer to the first substrate than the second end face; in response to that the first auxiliary structure comprises a plurality of first auxiliary sub-electrodes and the second auxiliary structure comprises a plurality of second auxiliary sub-electrodes, for each spacer, an orthographic projection of the first end face on the first dielectric substrate is located in an orthographic projection of one first auxiliary sub-electrode on the first dielectric substrate, and an orthographic projection of the second end face on the second dielectric substrate is located in an orthographic projection of one second auxiliary sub-electrode on the second dielectric substrate.

8. The phase shifter of claim 2, further comprising:

a first protective layer and a second protective layer, the first protective layer is located on a side, away from the first dielectric substrate, of a layer where the first electrode and the first auxiliary structure are located, and the second protective layer is located on a side, away from the second dielectric substrate, of a layer where the second electrode and the second auxiliary structure are located.

9. The phase shifter of claim 1, wherein a material of the first auxiliary structure and the second auxiliary structure comprises organic resin.

10. The phase shifter of claim 9, wherein a thickness of the first auxiliary structure is not less than that of the first electrode, and/or a thickness of the second auxiliary structure is not less than that of the second electrode.

11. The phase shifter of claim 9, further comprising:

a first negative stress film layer covering the first electrode and a second negative stress film layer covering the second electrode; in the peripheral region, the first auxiliary structure is located on a side, away from the first dielectric substrate, of the first negative stress film layer;

the second auxiliary structure is located on a side, away from the second dielectric substrate, of the second negative stress film layer.

12. The phase shifter of claim 1, further comprising:

a first mark pattern and a first buffer layer sequentially arranged along a direction away from the first dielectric substrate, and a second mark pattern and a second buffer layer sequentially arranged along a direction away from the second dielectric substrate; the first buffer layer is located between the first mark pattern and the first electrode, and the second buffer layer is located between the second mark pattern and the second electrode;

an orthographic projection of the first mark pattern on the first dielectric substrate is overlapped with an orthographic projection of the first electrode on the first dielectric substrate; an orthographic projection of the second mark pattern on the first dielectric substrate is overlapped with an orthographic projection of the second electrode on the first dielectric substrate.

13. The phase shifter of claim 1, wherein the first electrode comprises a first transmission line and a second transmission line arranged side by side and each extending along the transmission direction in which the microwave signal is transmitted; the second electrode comprises a plurality of patch structures arranged side by side along the transmission direction in which the microwave signal is transmitted, and orthographic projections of two end parts of any one of the patch structures on the first dielectric substrate are at least partially overlapped with orthographic projections of the first transmission line and the second transmission line on the first dielectric substrate respectively, to form capacitors located in the overlapping region.

14. The phase shifter of claim 13, wherein the two end parts of each patch structure are respectively a first end part and a second end part; for each patch structure, orthographic projections of the first end part and the first transmission line on the first dielectric substrate are overlapped at a first region, orthographic projections of the second end part and the second transmission line on the first dielectric substrate are overlapped at a second region, and areas of the first region and the second region are equal to each other.

15. The phase shifter of claim 14, wherein along the transmission direction in which the microwave signal is transmitted, areas of first regions are monotonically increased or monotonically decreased, areas of second regions are monotonically increased or monotonically decreased.

16. The phase shifter of claim 1, wherein the first electrode comprises a first transmission line, extending along the transmission direction in which the microwave signal is transmitted, and a plurality of first branches connected to the first transmission line and arranged side by side in the transmission direction in which the microwave signal is transmitted; the second electrode comprises a second transmission line, extending along the transmission direction in which the microwave signal is transmitted, and a plurality of second branches connected to the second transmission line and arranged side by side in the transmission direction in which the microwave signal is transmitted; an orthographic projection of an end part of each first branch, away from the first transmission line, on the first dielectric substrate is at least partially overlapped with an orthographic projection of an end part of one second branch, away from the second transmission line, on the first dielectric substrate, to form a capacitor located in the overlapping region.

17. The phase shifter of claim 13, further comprising:

a first feeding structure and a second feeding structure, an end of each of the first transmission line and the second transmission line is electrically connected with the first feeding structure, and another end of each of the first transmission line and the second transmission line is electrically connected with the second feeding structure.

18. A method for manufacturing a phase shifter, comprising:

forming a first substrate and a second substrate, and aligning and combining the first substrate and the second substrate into a cell, and filling a dielectric layer between the first substrate and the second substrate;

wherein the phase shifter has a phase shift region and a peripheral region, the phase shift region comprises at least one group of overlapping regions, and each group comprises a plurality of overlapping regions arranged at intervals along a transmission direction in which a microwave signal is transmitted;

the forming the first substrate comprises:

providing a first dielectric substrate; and forming a first electrode and a first auxiliary structure on the first dielectric substrate, with the first electrode being located in the phase shift region, and the first auxiliary structure being located in the peripheral region;

the forming the second substrate comprises:

providing a second dielectric substrate; and forming a second electrode and a second auxiliary structure on the second dielectric substrate, with the second electrode being located in the phase shift region, and the second auxiliary structure being located in the peripheral region; orthographic projections of the first electrode and the second electrode in the overlapping regions are at least partially overlapped to form a plurality of capacitors.

19. The method of claim 18, wherein the first auxiliary structure comprises a plurality of first auxiliary sub-electrodes; the second auxiliary electrode comprises a plurality of second auxiliary sub-electrodes;

the forming the first electrode and the first auxiliary sub-electrode comprises:

forming a first metal film layer on the first dielectric substrate, performing electroplating on the first metal film layer, and forming a pattern comprising the first electrode and the first auxiliary sub-electrode by a patterning process;

the forming the second electrode and the second auxiliary sub-electrode comprises:

forming a second metal film layer on the second dielectric substrate, performing electroplating on the second metal film layer, and forming a pattern comprising the second electrode and the second auxiliary sub-electrode by a patterning process.

20. An antenna, comprising the phase shifter of claim 1.

* * * * *